United States Patent
Yu et al.

(10) Patent No.: US 11,218,575 B2
(45) Date of Patent: Jan. 4, 2022

(54) COMMUNICATION METHOD AND COMMUNICATIONS DEVICE

(71) Applicant: HUAWEI TECHNOLOGIES CO., LTD., Shenzhen (CN)

(72) Inventors: Delei Yu, Beijing (CN); Shoushou Ren, Beijing (CN); Xiuli Zheng, Beijing (CN); Haiyan Mao, Beijing (CN); Yongtao Zhang, Shenzhen (CN); Ailiang Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/983,154

(22) Filed: Aug. 3, 2020

(65) Prior Publication Data

US 2020/0366767 A1 Nov. 19, 2020

Related U.S. Application Data

(63) Continuation of application No. PCT/CN2019/072821, filed on Jan. 23, 2019.

(30) Foreign Application Priority Data

Feb. 5, 2018 (CN) .......................... 201810113532.4

(51) Int. Cl.
*H04L 29/06* (2006.01)
*H04L 29/12* (2006.01)
*H04L 29/08* (2006.01)

(52) U.S. Cl.
CPC .......... *H04L 69/22* (2013.01); *H04L 61/2007* (2013.01); *H04L 61/2592* (2013.01); *H04L 69/325* (2013.01)

(58) Field of Classification Search
None
See application file for complete search history.

(56) References Cited

U.S. PATENT DOCUMENTS 7,853,642 B2 12/2010 Kang
2013/0346823 A1 12/2013 Cideciyan
(Continued)

FOREIGN PATENT DOCUMENTS

CN 201499182 U 6/2010
CN 102780619 A 11/2012
(Continued)

OTHER PUBLICATIONS

Deering et al., "Internet Protocol, Version 6 (IPv6) Specification", RFC2460, Dec. 1998, 39 pages.
(Continued)

*Primary Examiner* — James A Edwards
(74) *Attorney, Agent, or Firm* — Maier & Maier, PLLC

(57) ABSTRACT

A communication method and a communications device, so that both a location and a length of information carried in a data packet header are flexible and variable, the length does not need to be fixed, and the location does not need to be specified. Compared with a conventional protocol, the communication method has stronger flexibility and higher scalability. The method includes: obtaining, by a first device, a data packet, where the data packet includes a first packet header, the first packet header includes first indication information and a value of first packet header information, the first indication information is used to indicate a location of the value of the first packet header information, and the first packet header information is device identification information; and processing, by the first device, the data packet.

16 Claims, 13 Drawing Sheets

100

(56) References Cited

U.S. PATENT DOCUMENTS

2016/0219024 A1* 7/2016 Verzun ................. H04L 9/34
2017/0264600 A1* 9/2017 Froelicher ........... H04L 61/6004

FOREIGN PATENT DOCUMENTS

| CN | 104009921 A | 8/2014 |
| CN | 106506641 A | 3/2017 |
| EP | 1445919 A2 | 8/2004 |
| WO | 2007143679 A2 | 12/2007 |

OTHER PUBLICATIONS

Information Sciences Institute, Internet Protocol Darpa Internet Program Protocol Specification, RFC791, Sep. 1981, 49 pages.
IEEE, IEEE Standard for Information technology—Telecommunications and information exchange between systems—Local and metropolitan area networks—Specific requirements Part 15.4: Wireless Medium Access Control (MAC) and Physical Layer (PHY) Specifications for Low-Rate Wireless Personal Area Networks (WPANs), IEEE Std 802.15.4-2006, Sep. 8, 2006, 322 pages.
Tingrong Lu et al. "Extending Address Space of IP Networks with Hierarchical Addressing". Jan. 1, 2005. Advances in Computer Systems Architecture Lecture Notes in Computer Science. LNCS, Springer. pp. 499-508. XP019022384.

* cited by examiner

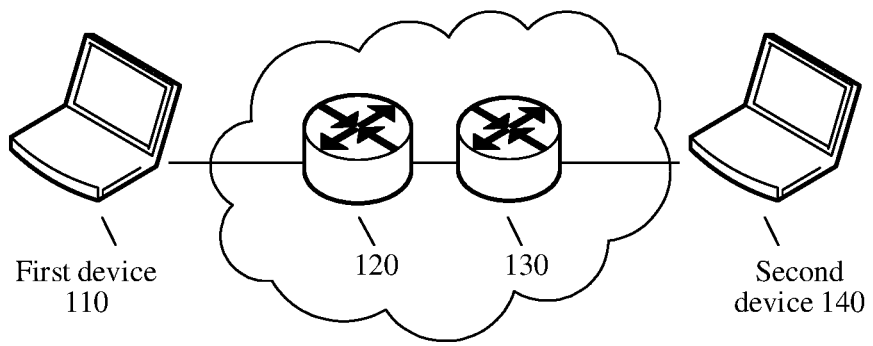

100

First device 110    120    130    Second device 140

A first device obtains a data packet, where the data packet includes a first packet header, the first packet header includes first indication information and a value of first packet header information, the first indication information is used to indicate a location of the value of the first packet header information, and the first packet header information is device identification information — 201

The first device processes the data packet — 202

FIG. 2

| 1 | 1 | 0 | 0 | 1 | 0 | 0 | 0 |   First basic unit

| 1 | 1 | 1 | 0 | 1 | 0 | 0 | 0 |   Second basic unit

| 0 | 1 | 0 | 1 | 0 | 1 | 1 | 0 |   Third basic unit

FIG. 3

| 0 | 1 | 1 |   First value

| 1 | 1 | 0 | 0 | 1 | 0 | 0 | 0 |   First basic unit

| 1 | 1 | 1 | 0 | 1 | 0 | 0 | 0 |   Second basic unit

| 1 | 1 | 0 | 1 | 0 | 1 | 1 | 0 |   Third basic unit

FIG. 4

| Type of first packet header information | Value |
|---|---|
| Destination address | 001 |
| Source address | 002 |
| Hop limit | 003 |
| ... | ... |

COMMUNICATION METHOD AND COMMUNICATIONS DEVICE

CROSS-REFERENCE TO RELATED APPLICATIONS

This application is a continuation of International Application No. PCT/CN2019/072821, filed on Jan. 23, 2019, which claims priority to Chinese Patent Application No. 201810113532.4, filed on Feb. 5, 2018. The disclosures of the aforementioned applications are hereby incorporated by reference in their entireties.

TECHNICAL FIELD

The embodiments relate to the communications field, and more specifically, to a communication method and a communications device.

BACKGROUND

In the prior art, because an address provided by internet protocol version 4 (IPv4) cannot meet a communication requirement in some scenarios, internet protocol version 6 (IPv6) is proposed. A packet header of an IPv4 protocol packet is fixed to 20 bytes without considering an option field, and a source address and a destination address each occupy 4 bytes (32 bits). A packet header of an IPv6 protocol packet is fixed to 40 bytes without considering an extension header, and a source address and a destination address each occupy 16 bytes (128 bits). To normally parse a packet, the packet needs to be encapsulated strictly according to regulations of the IPv4/IPv6 protocol, so that a source address and a destination address are located at specific locations and address lengths need to be fixed. The header of the IPv4 protocol or of the IPv6 protocol is fixed, flexibility is poor, and compatibility between the IPv4 protocol and the IPv6 protocol is also poor.

Therefore, a problem that is urgently to be resolved is to provide a flexible communication method, so that a location of packet header information in a data packet does not need to be fixed, and the method has stronger flexibility and higher compatibility.

SUMMARY

The embodiments provide a communication method and a communications device, so that a location of packet header information included in data does not need to be fixed, and the communication method has stronger flexibility and higher compatibility.

According to a first aspect, a communication method is provided. The method includes: obtaining, by a first device, a data packet, where the data packet includes a first packet header, the first packet header includes first indication information and a value of first packet header information, the first indication information is used to indicate a location of the value of the first packet header information, and the first packet header information is device identification information; and processing, by the first device, the data packet.

Therefore, in this embodiment, the first packet header information is the device identification information. In addition, the first indication information of the value of the first packet header information is added to the data packet, and the location of the value of the first packet header information is indicated according to the first indication information. Therefore, the location of the value of the first packet header information in the first packet header does not need to be fixed. In addition, a quantity of bits of the value of the first packet header information does not need to be agreed on in advance. Therefore, a location of the device identification information in the data packet and a length of the device identification information do not need to be fixed, so that flexibility is stronger, and compatibility is higher.

With reference to the first aspect, in some implementations of the first aspect, the device identification information includes, but is not limited to, any one of the following information: a device address, a device ID, a device label, and the like.

In this case, the device address, the device ID, the device label, and the like may be used as the device identification information, to perform diversified identification on a device. In addition, when the device identification information is the device address, a location and a length of the device address in the data packet do not need to be fixed, and the location of the device address may be determined according to the first indication information, to avoid a problem that bandwidth consumption and memory consumption are caused because a specified address field is excessively long and a problem that a requirement cannot be satisfied because a specified address field is excessively short.

With reference to the first aspect, in some implementations of the first aspect, the data packet may be, but is not limited to, any one of the following data packets: a network layer data packet, a data link layer data packet, and the like.

With reference to the first aspect, in some implementations of the first aspect, a plurality of pieces of the first packet header information in the first packet header may be arranged in an agreed sequence.

With reference to the first aspect, in some implementations of the first aspect, the first packet header information may alternatively be any one of the following information: a traffic class traffic class, a flow label flow label, a payload length, a hop limit, and a next header.

In this case, locations of the traffic class traffic class, the flow label flow label, the payload length, the hop limit, and the next header may be separately indicated by using the first indication information, so that locations of fields in a data packet at an existing network layer may be flexible and variable, thereby avoiding bandwidth consumption and memory consumption caused by extremely long fields.

With reference to the first aspect, in some implementations of the first aspect, the value of the first packet header information includes N consecutive bits, where N≥1.

With reference to the first aspect, in some implementations of the first aspect, the first indication information includes a first value indicating a location of the first packet header information, the first value is used to indicate a quantity N of the N consecutive bits or a quantity of basic units, and the basic unit is used to carry the N consecutive bits.

With reference to the first aspect, in some implementations of the first aspect, at least one fixed bit is used to carry the first indication information.

With reference to the first aspect, in some implementations of the first aspect, the first indication information includes M first bits, the M first bits are located before the N consecutive bits, and/or the M first bits are located after the N consecutive bits, where M≥1.

With reference to the first aspect, in some implementations of the first aspect, the value of the first packet header information includes $N_i$ consecutive first bits and $N_{i+1}$ consecutive second bits, where i≥1;

the first indication information includes third bits; and the third bits are located before the $N_i$ consecutive first bits, between the $N_i$ consecutive first bits and the $N_{i+1}$ consecutive second bits, and/or after the $N_{i+1}$ consecutive second bits.

With reference to the first aspect, in some implementations of the first aspect, an $i^{th}$ basic unit includes the $N_i$ consecutive first bits and the third bit before the $N_i$ consecutive first bits, and an $(i+1)^{th}$ basic unit includes the $N_{i+1}$ consecutive second bits and the third bit before the $N_{i+1}$ consecutive second bits.

With reference to the first aspect, in some implementations of the first aspect, the third bit in the $i^{th}$ basic unit is used to indicate whether a next basic unit connected to the $i^{th}$ basic unit is the $(i+1)^{th}$ basic unit.

With reference to the first aspect, in some implementations of the first aspect, the first indication information further includes a first value indicating a location of the first packet header information, the first value is used to indicate a quantity of basic units that are included in the value of the first packet header information, and the third bit in the $i^{th}$ basic unit is used to indicate whether the $i^{th}$ basic unit is the value of the first packet header information.

With reference to the first aspect, in some implementations of the first aspect, a quantity of bits of the $i^{th}$ basic unit is the same as a quantity of bits of the $(i+1)^{th}$ basic unit; or a quantity of bits of the $i^{th}$ basic unit and a quantity of bits of the $(i+1)^{th}$ basic unit are increased or decreased based on a predetermined step in an arrangement sequence of the basic units.

With reference to the first aspect, in some implementations of the first aspect, when a value of the first indication information is in a first interval, the first indication information is the value of the first packet header information; or when a value of the first indication information is in a second interval, the first indication information is used to indicate the location of the value of the first packet header information.

With reference to the first aspect, in some implementations of the first aspect, a value in the first interval is less than or equal to a first threshold, and a value in the second interval is greater than the first threshold.

With reference to the first aspect, in some implementations of the first aspect, when the first indication information is greater than the first threshold, the first indication information and the first threshold jointly indicate that the first indication information is used to indicate the location of the value of the first packet header information.

With reference to the first aspect, in some implementations of the first aspect, the first indication information includes a first value indicating a location, and the first value includes S consecutive bits.

With reference to the first aspect, in some implementations of the first aspect, the first packet header further includes second indication information, the second indication information includes a second value indicating a location of the first value, the second value is used to indicate a quantity of the S consecutive bits or a quantity of basic units, and the basic unit is used to carry the S consecutive bits.

With reference to the first aspect, in some implementations of the first aspect, the first packet header further includes the second indication information, the second indication information includes the second value indicating the location of the first value, the second value includes D fourth bits, the D consecutive fourth bits are located before the S consecutive bits, and/or the D consecutive fourth bits are located after the S consecutive bits, where $D \geq 1$.

With reference to the first aspect, in some implementations of the first aspect, the first value includes $S_j$ consecutive fourth bits and $S_{j+1}$ consecutive fifth bits, where $j \geq 1$;

second indication information includes sixth bits, the first packet header further includes the second indication information, and the second indication information includes a location indicating the first indication information; and the sixth bits are located before the $S_j$ consecutive fourth bits, between the $S_j$ consecutive fourth bits and the $S_{j+1}$ consecutive fifth bits, and/or after the $S_{j+1}$ consecutive fifth bits.

With reference to the first aspect, in some implementations of the first aspect, a $j^{th}$ basic unit includes the $S_j$ consecutive fourth bits and the sixth bit before the $S_j$ consecutive fourth bits, and a $(j+1)^{th}$ basic unit includes the $S_{j+1}$ consecutive fifth bits and the sixth bit before the $S_{j+1}$ consecutive fifth bits.

With reference to the first aspect, in some implementations of the first aspect, the sixth bit in the $j^{th}$ basic unit is used to indicate whether a next basic unit connected to the $j^{th}$ basic unit is the $(j+1)^{th}$ basic unit.

With reference to the first aspect, in some implementations of the first aspect, the second indication information further includes a second value indicating a location, the second value is used to indicate a quantity of basic units that are included in the first indication information, and the sixth bit in the $j^{th}$ basic unit is used to indicate whether the $j^{th}$ basic unit is the value of the first indication information.

With reference to the first aspect, in some implementations of the first aspect, a quantity of bits of the $j^{th}$ basic unit is the same as a quantity of bits of the $(j+1)^{th}$ basic unit; or a quantity of bits of the $j^{th}$ basic unit and a quantity of bits of the $(j+1)^{th}$ basic unit are increased or decreased based on a predetermined step in an arrangement sequence of the basic units.

With reference to the first aspect, in some implementations of the first aspect, when a value of the second indication information is in a third interval, the first indication information is the value of the first indication information; or when a value of the second indication information is in a fourth interval, the first indication information is used to indicate a location of the value of the first indication information.

With reference to the first aspect, in some implementations of the first aspect, a value in the third interval is less than or equal to a second threshold, and a value in the fourth interval is greater than the second threshold.

With reference to the first aspect, in some implementations of the first aspect, when the second indication information is greater than the first threshold, the second indication information and the second threshold jointly indicate the location of the value of the first indication information.

With reference to the first aspect, in some implementations of the first aspect, the first packet header further includes third indication information and a type of the first packet header information, and the third indication information is used to indicate a location of the type of the first packet header information.

In this case, the indication information indicating the type of the first packet header is added to the first packet header, so that a sequence of the first packet header information can be flexible and variable. Alternatively, the first packet header information can appear as required, avoiding useless first packet header information.

With reference to the first aspect, in some implementations of the first aspect, the type of the first packet header information includes Z consecutive bits, where $Z \geq 1$.

With reference to the first aspect, in some implementations of the first aspect, the third indication information includes a third value indicating the location of the type of the first packet header information, the third value is used to indicate a quantity N of the Z consecutive bits or a quantity of basic units, and the basic unit is used to carry the Z consecutive bits.

With reference to the first aspect, in some implementations of the first aspect, at least one fixed bit is used to carry the third indication information.

With reference to the first aspect, in some implementations of the first aspect, the third value includes X seventh bits, and the X seventh bits are located before the Z consecutive bits, and/or the X seventh bits are located after the Z consecutive bits, where X≥1.

With reference to the first aspect, in some implementations of the first aspect, the type of the first packet header information includes $Z_k$ consecutive seventh bits and $Z_{k+1}$ consecutive eighth bits, where k≥1;

the third indication information includes ninth bits; and the ninth bits are located before the $Z_k$ consecutive seventh bits, between the $Z_k$ consecutive seventh bits and the $Z_{k+1}$ consecutive eighth bits, and/or after the $Z_{k+1}$ consecutive eighth bits.

With reference to the first aspect, in some implementations of the first aspect, a $k^{th}$ basic unit includes the $Z_k$ consecutive seventh bits and the ninth bit before the $Z_k$ consecutive seventh bits, and a $(k+1)^{th}$ basic unit includes the $Z_{k+1}$ consecutive eighth bits and the ninth bit before the $Z_{k+1}$ consecutive eighth bits.

With reference to the first aspect, in some implementations of the first aspect, the third bit in the $k^{th}$ basic unit is used to indicate whether a next basic unit connected to the $k^{th}$ basic unit is the $(k+1)^{th}$ basic unit.

With reference to the first aspect, in some implementations of the first aspect, the third indication information further includes the third value indicating the location of the type of the first packet header information, the third value is used to indicate a quantity of basic units that are included in the type of the first packet header information, and the ninth bit in the $k^{th}$ basic unit is used to indicate whether the $k^{th}$ basic unit is the type of the first packet header information.

With reference to the first aspect, in some implementations of the first aspect, a quantity of bits of the $k^{th}$ basic unit is the same as a quantity of bits of the $(k+1)^{th}$ basic unit; or a quantity of bits of the $k^{th}$ basic unit and a quantity of bits of the $(k+1)^{th}$ basic unit are increased or decreased based on a predetermined step in an arrangement sequence of the basic units.

With reference to the first aspect, in some implementations of the first aspect, the processing, by the first device, the data packet includes:

sending, by the first device, the data packet to an intermediate node; or parsing, by the first device, the data packet, and determining whether to forward the data packet.

With reference to the first aspect, in some implementations of the first aspect, the parsing, by the first device, the data packet, and determining whether to forward the data packet includes:

when the first device is a destination device of the data packet, transmitting, by the first device, the parsed data packet to a central processing unit CPU of the first device; or when the first device is not a destination device of the data packet, forwarding, by the first device, the data packet according to a forwarding information table and/or a forwarding policy.

With reference to the first aspect, in some implementations of the first aspect, when a value of the third indication information is in a fifth interval, the first indication information is the type of the first packet header information; or when a value of the first indication information is in a sixth interval, the first indication information is used to indicate the location of the type of the first packet header information.

With reference to the first aspect, in some implementations of the first aspect, a value in the fifth interval is less than or equal to a third threshold, and a value in the sixth interval is greater than the third threshold.

With reference to the first aspect, in some implementations of the first aspect, when the third indication information is greater than the third threshold, the third indication information and the third threshold jointly indicate the type of the first packet header information.

According to a second aspect, a communications device is provided. The communications device is a first device and includes:

an obtaining module, configured to obtain a data packet, where the data packet includes a first packet header, the first packet header includes first indication information and a value of first packet header information, the first indication information is used to indicate a location of the value of the first packet header information, and the first packet header information is device identification information; and a processing module, configured to process the data packet.

With reference to the second aspect, in some implementations of the second aspect, the value of the first packet header information includes N consecutive bits, where N≥1.

With reference to the second aspect, in some implementations of the first aspect, the data packet may be but is not limited to any one of the following data packets: a network layer data packet, a data link layer data packet, and the like.

With reference to the second aspect, in some implementations of the second aspect, the first indication information includes a first value indicating a location of the first packet header information, the first value is used to indicate a quantity N of the N consecutive bits or a quantity of basic units, and the basic unit is used to carry the N consecutive bits.

With reference to the second aspect, in some implementations of the second aspect, the first indication information includes M first bits, the M first bits are located before the N consecutive bits, and/or the M first bits are located after the N consecutive bits, where M≥1.

With reference to the second aspect, in some implementations of the second aspect, the value of the first packet header information includes $N_i$ consecutive first bits and $N_{i+1}$ consecutive second bits, where i≥1;

the first indication information includes third bits; and the third bits are located before the $N_i$ consecutive first bits, between the $N_i$ consecutive first bits and the $N_{i+1}$ consecutive second bits, and/or after the $N_{i+1}$ consecutive second bits.

With reference to the second aspect, in some implementations of the second aspect, an $i^{th}$ basic unit includes the $N_i$ consecutive first bits and the third bit before the $N_i$ consecutive first bits, and an $(i+1)^{th}$ basic unit includes the $N_{i+1}$ consecutive second bits and the third bit before the $N_{i+1}$ consecutive second bits.

With reference to the second aspect, in some implementations of the second aspect, the third bit in the $i^{th}$ basic unit is used to indicate whether a next basic unit connected to the $i^{th}$ basic unit is the $(i+1)^{th}$ basic unit.

With reference to the second aspect, in some implementations of the second aspect, the first indication information further includes a first value indicating a location, the first value is used to indicate a quantity of basic units that are included in the value of the first packet header information, and the third bit in the $i^{th}$ basic unit is used to indicate whether the $i^{th}$ basic unit is the value of the first packet header information.

With reference to the second aspect, in some implementations of the second aspect, a quantity of bits of the $i^{th}$ basic unit is the same as a quantity of bits of the $(i+1)^{th}$ basic unit; or a quantity of bits of the $i^{th}$ basic unit and a quantity of bits of the $(i+1)^{th}$ basic unit are increased or decreased based on a predetermined step in an arrangement sequence of the basic units.

With reference to the second aspect, in some implementations of the second aspect, the first indication information includes the first value indicating the location, and the first value includes S consecutive bits.

With reference to the second aspect, in some implementations of the second aspect, the first packet header further includes second indication information, the second indication information includes a second value indicating a location of the first value, the second value is used to indicate a quantity of the S consecutive bits or a quantity of basic units, and the basic unit is used to carry the S consecutive bits.

With reference to the second aspect, in some implementations of the second aspect, the first packet header further includes second indication information, the second indication information includes the second value indicating the location of the first value, the second value includes D fourth bits, the D consecutive fourth bits are located before the S consecutive bits, and/or the D consecutive fourth bits are located after the S consecutive bits, where D≥1.

With reference to the second aspect, in some implementations of the second aspect, the first value includes $S_j$ consecutive fourth bits and $S_{j+1}$ consecutive fifth bits, where j≥1;

second indication information includes sixth bits, the first packet header further includes the second indication information, and the second indication information includes a location indicating the first indication information; and the sixth bits are located before the $S_j$ consecutive fourth bits, between the $S_j$ consecutive fourth bits and the $S_{j+1}$ consecutive fifth bits, and/or after the $S_{j+1}$ consecutive fifth bits.

With reference to the second aspect, in some implementations of the second aspect, a $j^{th}$ basic unit includes the $S_j$ consecutive fourth bits and the sixth bit before the $S_j$ consecutive fourth bits, and a $(j+1)^{th}$ basic unit includes the $S_{j+1}$ consecutive fifth bits and the sixth bit before the $S_{j+1}$ consecutive fifth bits.

With reference to the second aspect, in some implementations of the second aspect, the sixth bit in the $j^{th}$ basic unit is used to indicate whether a next basic unit connected to the $j^{th}$ basic unit is the $(j+1)^{th}$ basic unit.

With reference to the second aspect, in some implementations of the second aspect, the second indication information further includes the second value indicating the location, the second value is used to indicate a quantity of basic units that are included in the first indication information, and the sixth bit in the $j^{th}$ basic unit is used to indicate whether the $j^{th}$ basic unit is the value of the first indication information.

With reference to the second aspect, in some implementations of the second aspect, a quantity of bits of the $j^{th}$ basic unit is the same as a quantity of bits of the $(j+1)^{th}$ basic unit; or a quantity of bits of the $j^{th}$ basic unit and a quantity of bits of the $(j+1)^{th}$ basic unit are increased or decreased based on a predetermined step in an arrangement sequence of the basic units.

With reference to the second aspect, in some implementations of the second aspect, the first packet header further includes third indication information and a type of the first packet header information, and the third indication information is used to indicate a location of the type of the first packet header information.

With reference to the second aspect, in some implementations of the second aspect, the type of the first packet header information includes Z consecutive bits, where Z≥1.

With reference to the second aspect, in some implementations of the second aspect, the third indication information includes a third value indicating the location of the type of the first packet header information, the third value is used to indicate a quantity N of the Z consecutive bits or a quantity of basic units, and the basic unit is used to carry the Z consecutive bits.

With reference to the second aspect, in some implementations of the second aspect, the third value includes X seventh bits, and the X seventh bits are located before the Z consecutive bits, and/or the X seventh bits are located after the Z consecutive bits, where X≥21.

With reference to the second aspect, in some implementations of the second aspect, the type of the first packet header information includes $Z_k$ consecutive seventh bits and $Z_{k+1}$ consecutive eighth bits, where k≥1;

the third indication information includes ninth bits; and the ninth bits are located before the $Z_k$ consecutive seventh bits, between the $Z_k$ consecutive seventh bits and the $Z_{k+1}$ consecutive eighth bits, and/or after the $Z_{k+1}$ consecutive eighth bits.

With reference to the second aspect, in some implementations of the second aspect, a $k^{th}$ basic unit includes the $Z_k$ consecutive seventh bits and the ninth bit before the $Z_k$ consecutive seventh bits, and a $(k+1)^{th}$ basic unit includes the $Z_{k+1}$ consecutive eighth bits and the ninth bit before the $Z_{k+1}$ consecutive eighth bits.

With reference to the second aspect, in some implementations of the second aspect, the third bit in the $k^{th}$ basic unit is used to indicate whether a next basic unit connected to the $k^{th}$ basic unit is the $(k+1)^{th}$ basic unit.

With reference to the second aspect, in some implementations of the second aspect, the third indication information further includes the third value indicating the location of the type of the first packet header information, the third value is used to indicate a quantity of basic units that are included in the type of the first packet header information, and the ninth bit in the $k^{th}$ basic unit is used to indicate whether the $k^{th}$ basic unit is the type of the first packet header information.

With reference to the second aspect, in some implementations of the second aspect, a quantity of bits of the $k^{th}$ basic unit is the same as a quantity of bits of the $(k+1)^{th}$ basic unit; or a quantity of bits of the $k^{th}$ basic unit and a quantity of bits of the $(k+1)^{th}$ basic unit are increased or decreased based on a predetermined step in an arrangement sequence of the basic units.

With reference to the second aspect, in some implementations of the second aspect, when a value of the first indication information is in a first interval, the first indication information is the value of the first packet header information; or when a value of the first indication information is in a second interval, the first indication information is used to indicate the location of the value of the first packet header information.

With reference to the second aspect, in some implementations of the second aspect, a value in the first interval is less than or equal to a first threshold, and a value in the second interval is greater than the first threshold.

With reference to the second aspect, in some implementations of the second aspect, when the first indication information is greater than the first threshold, the first indication information and the first threshold jointly indicate that the first indication information is used to indicate the location of the value of the first packet header information.

With reference to the second aspect, in some implementations of the second aspect, the processing, by the first device, the data packet includes:

sending, by the first device, the data packet to an intermediate node; or parsing, by the first device, the data packet, and determining whether to forward the data packet.

With reference to the second aspect, in some implementations of the second aspect, the processing module is configured to:

when the first device is a destination device of the data packet, transmit the parsed data packet to a central processing unit CPU of the first device; or when the first device is not a destination device of the data packet, forward the data packet according to a forwarding information table and/or a forwarding policy.

According to a third aspect, a communications device is provided. The communications device includes at least one processor, a memory, and a transceiver. The memory is configured to store an instruction, the transceiver is used by the communications device to communicate with another device, and the stored instruction is directly or indirectly executed by the at least one processor, to enable the communications device to perform the method according to any one of the first aspect or the optional implementations of the first aspect.

According to a fourth aspect, a chip system is provided. The chip system includes at least one processor. The at least one processor is configured to execute a stored instruction, to enable a communications device to perform the method according to any one of the first aspect or the optional implementations of the first aspect.

According to a fifth aspect, a computer program product is provided. The computer program product includes an instruction, and when the instruction is executed, a communications device is enabled to perform the method according to any one of the first aspect or the optional implementations of the first aspect.

According to a sixth aspect, a computer storage medium is provided. The computer storage medium stores a program instruction, and when the instruction is executed, a communications device can perform the method according to any one of the first aspect or the optional implementations of the first aspect.

BRIEF DESCRIPTION OF DRAWINGS

FIG. 1 is a schematic architectural diagram of a communications system of a communication method and a communications device according to an embodiment;

FIG. 2 is a schematic flowchart of a communication method according to an embodiment;

FIG. 3 shows a format of a value of first packet header information according to an embodiment;

FIG. 4 shows a format of a value of first packet header information according to an embodiment;

DESCRIPTION OF EMBODIMENTS

Figure 5:
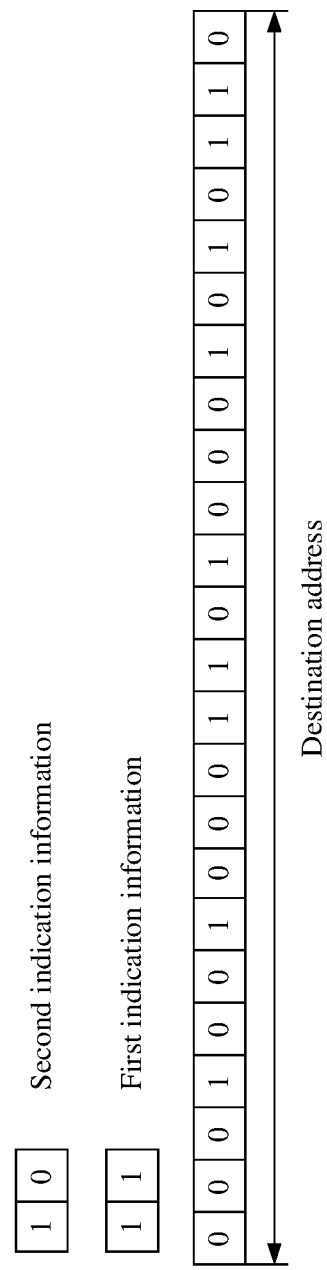
FIG. 5 shows a format of a value of first packet header information according to an embodiment.

The following describes technical solutions in in the embodiments with reference to the accompanying drawings.

FIG. 1 is a schematic architectural diagram of a communications system 100 of a communication method and a communications device according to the embodiments. The system 100 includes a first device 110, a router 120, a router 130, and a second device 140. The first device 110 and the second device 140 send and receive a message by using the router 120 and the router 130. The system 100 may be a schematic architectural diagram in an internet of things (IoT) network, a closed networking scenario, and a conventional IP network.

It can be noted that the system shown in FIG. 1 is merely intended to understand the embodiments more clearly, and is non-limiting on any embodiments. In addition to the device shown in FIG. 1, the network architecture may further include another device. For example, the system 100 may further include another device. A message may alternatively be forwarded between the first device 110 and the second device 140 by using more routers, or a message may be forwarded between the first device 110 and the second device 140 without using a router. This is not limited in this embodiment.

The first device 110 and the second device 140 each may be user equipment (UE), for example, a mobile phone or a computer, or may be a cellular phone, a cordless telephone set, a session initiation protocol (SIP) telephone, a smartphone, a wireless local loop (WLL) station, a personal digital assistant (PDA), a computer, a laptop computer, a handheld communications device, a handheld computing device, a satellite wireless device, a wireless modem card, a television set-top box (STB), a customer premises equipment (CPE), and/or another device configured to communicate on a wireless system and a wired system.

Alternatively, the first device 110 and the second device 140 each may be an access network device, for example, may be an access network (AN)/radio access network (RAN) device. A network includes a plurality of 5G-AN/5G-RAN nodes. The 5G-AN/5G-RAN node may be: an access node (AP), a next-generation NodeB (NR nodeB, gNB), a gNB in which a central unit is separated from a distributed unit, a transmission reception point (TRP), a transmission point, or another access node.

The technical solutions of the embodiments may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communications system, a future 5th generation (5G) system, or a new radio (NR) access system.

To better understand the embodiments, by using a system the same as or similar to the system shown in FIG. 1 as an example, the embodiments are described below with reference to FIG. 2 to FIG. 16.

It can be understood that the following first device may be any device in FIG. 1.

FIG. 2 is a schematic flowchart of a communication method 200 according to the embodiments. As shown in FIG. 2, the method 200 includes the following content.

201. A first device obtains a data packet. The data packet includes a first packet header, the first packet header includes first indication information and a value of first packet header information, the first indication information is used to indicate a location of the value of the first packet header information, and the first packet header information is device identification information.

202. The first device processes the data packet.

Therefore, in this embodiment, the first packet header information is the device identification information. In addition, the first indication information of the value of the first packet header information is added to the data packet, and the location of the value of the first packet header information is indicated according to the first indication information. Therefore, the location of the value of the first packet header information in the first packet header does not need to be fixed. In addition, a quantity of bits of the value of the first packet header information does not need to be agreed on in advance. Therefore, in the embodiment, a location of the device identification information in the data packet does not need to be fixed, so that flexibility is stronger, and compatibility is higher.

Optionally, the data packet may be, but is not limited to, any one of the following data packets: a network layer data packet, a data link layer data packet, and the like.

It can be understood that, in this embodiment, an example in which the data packet is the network layer data packet is used for description. When the data packet is a data packet at another layer, refer to corresponding description related to the network layer data packet.

Optionally, the device identification information includes, but is not limited to, any one of the following information: a device address, a device ID, a device label, and the like.

In this case, the device address, the device ID, and the device label may be used as the device identification information, to perform diversified identification on a device. In addition, when the device identification information is the device address, a location of the device address in the network layer data packet does not need to be fixed, and the location of the device address may be determined according to the first indication information, to avoid a problem that bandwidth consumption and memory consumption are caused because a specified address field is excessively long and a problem that a requirement cannot be satisfied because a specified address field is excessively short.

In the prior art, when a communications device uses internet protocol version 6 (IPv6) at a network layer, to normally parse an IPv6 data packet, the IPv6 data packet needs to include bandwidth overheads caused by a source address field and a destination address field that each occupy 128 bits. In this embodiment, because the location and a length of the value of the first packet header information in the first packet header do not need to be fixed, an address length can be flexibly increased as required. This can resolve a problem of an insufficient address length, and can also resolve bandwidth and memory overheads caused by an excessively long address.

It can be understood that, in this embodiment, an example in which the device identification information is the device IP address is used for description. When the device identification information is the device ID or device label, correspondingly refer to the descriptions of the device address.

Optionally, the value of the first packet header information may be referred to as a value or V, or may be indicated in another manner.

Optionally, a plurality of pieces of the first packet header information in the first packet header may be arranged in an agreed sequence.

Optionally, the first packet header information may alternatively be any one of the following information:
a traffic class traffic class, a flow label flow label, a payload length, a hop limit, and a next header.

In this case, locations of the traffic class traffic class, the flow label flow label, the payload length, the hop limit, and the next header may be separately indicated by using the first indication information, so that locations of fields in a data packet at an existing network layer may be flexible and variable, thereby avoiding bandwidth consumption and memory consumption caused by extremely long fields.

It can be understood that the first packet header information mentioned in this embodiment is merely used as an example, and the first packet header information may alternatively be other information. This is not limited.

Optionally, the value of the first packet header information includes N consecutive bits, where N≥1.

Optionally, the first indication information includes a first value indicating a location of the first packet header information, the first value is used to indicate a quantity of the N consecutive bits or a quantity of basic units, and the basic unit is used to carry the N consecutive bits.

For example, the first value may indicate the quantity of the N consecutive bits. For example, if the value of the first packet header information includes five consecutive bits, the first indication information is 5. The first value may alternatively indicate the quantity of basic units carrying the N consecutive bits. The basic unit is a set including bits. For example, the basic unit includes two bits, and the value of the first packet header information is binary 1010. Therefore, two basic units are required for carrying the first packet header information, and the first value is 2.

Optionally, a width of bits carrying the first indication information is fixed, or a quantity and a length of basic units carrying the first indication information are fixed.

Optionally, the first indication information may be referred to as a length field or an L field, or may be indicated in another manner.

Optionally, the value of the first packet header information may be referred to as a value field.

Optionally, the first packet header information includes the L field and the V field, and the L field is used to indicate a location of the V field.

Optionally, the first value includes M first bits. The M first bits are located before the N consecutive bits, and/or the M first bits are located after the N consecutive bits.

For example, assuming that the first packet header information is a destination address, and is indicated as 0x12 in hexadecimal format, the address 0x12 is converted into binary 1 0010, including a total of five consecutive bits. The first value is three consecutive bits. The first value may be located before the five consecutive bits, or may be located after the five consecutive bits, for example, 11110010 or 10010111.

Optionally, the value of the first packet header information includes $N_i$ consecutive first bits and $N_{i+1}$ consecutive second bits, where $i \geq 1$;

the first indication information includes third bits; and the third bits are located before the $N_i$ consecutive first bits, between the $N_i$ consecutive first bits and the $N_{i+1}$ consecutive second bits, and/or after the $N_{i+1}$ consecutive second bits.

For example, the $N_i$ consecutive first bits are not connected to the $N_{i+1}$ consecutive second bits, and the third bit or other indication information may be between the $N_i$ consecutive first bits and the $N_{i+1}$ consecutive second bits.

It can be understood that, when the third bit is located before the $N_i$ consecutive first bits, and/or after the $N_{i+1}$ consecutive second bits, other indication information may further be included between the $N_i$ consecutive first bits and the $N_{i+1}$ consecutive second bits. Other information is not limited in the embodiments.

Optionally, an $i^{th}$ basic unit includes the $N_i$ consecutive first bits and the third bit before the $N_i$ consecutive first bits, and an $(i+1)^{th}$ basic unit includes the $N_{i+1}$ consecutive second bits and the third bit before the $N_{i+1}$ consecutive first bits.

Optionally, the third bit in the $i^{th}$ basic unit is used to indicate whether a next basic unit connected to the $i^{th}$ basic unit is the $(i+1)^{th}$ basic unit.

For example, the third bit is identification information, and indicates whether the next basic unit of the $i^{th}$ basic unit is the $(i+1)^{th}$ basic unit. FIG. 3 shows a format of the value of the first packet header information according to the embodiments.

In FIG. 3, it is assumed that the first packet header information is a destination address, and is indicated as 0x123456 in hexadecimal format. A length of the basic unit is one byte. In other words, the basic unit includes eight bits, and the first bit in the basic unit is the third bit. The address 0x123456 is converted into binary 1 0010 0011 0100 0101 0110. Therefore, three basic units are required for encoding the destination address. The first basic unit is 11001000, and the first bit in the first basic unit is 1 and is used to indicate that a next basic unit is a second basic unit. The second basic unit is 11101000, and the first bit in the second basic unit is 1 and is used to indicate that a next basic unit is a third basic unit. The third basic unit is 01010110, and the first bit in the third basic unit is 0 and is used to indicate that a next basic unit no longer carries the destination address. In other words, the destination address ends at the third basic unit.

It can be understood that a location of the third bit in the basic unit is not limited in the embodiments. The third bit may be located in the first bit of the basic unit, or may be located in the last bit of the basic unit, or may be located in a middle bit of the basic unit. Alternatively, the location of the third bit in the basic unit may be increased or decreased based on an agreed step. For example, in the foregoing three basic units, the third bit is in the first bit of the first basic unit, the third bit is in the second bit of the second basic unit, and the third bit is in the third bit of the third basic unit. The first basic unit is 11001000, the second basic unit is 11101000, and the third basic unit is 01010110.

It can be further understood that in the basic unit, a quantity of bits used to carry the third bit is not limited in the embodiments either. For example, in the basic unit, two bits may be further used to carry the third bit. For example, in the $i^{th}$ basic unit, 11 is used to indicate that the next basic unit connected to the $i^{th}$ basic unit is the $(i+1)^{th}$ basic unit, and 00 is used to indicate that the next basic unit connected to the $i^{th}$ basic unit is not the $(i+1)^{th}$ basic unit.

It can be further understood that an organization sequence of a plurality of basic units indicating the value of the first packet header information is not limited in the embodiments. For example, in the foregoing descriptions, the address 0x123456 is converted into binary 1 0010 0011 0100 0101 0110, and the three basic units are required for encoding the destination address. The first basic unit is 11001000, the second basic unit is 11101000, and the third basic unit is 01010110. In other words, the first basic unit is indicated as 12, and the second basic unit is indicated as 34, the third basic unit is indicated as 56. Alternatively, the first basic unit is 11010110, the second basic unit is 11101000, and the third basic unit is 01001000. In other words, the first basic unit is indicated as 56, and the second basic unit is indicated as 34, the third basic unit is indicated as 12.

It can be further understood that the basic units may be consecutive or may be inconsecutive. For example, in the foregoing descriptions, the first basic unit, the second basic unit, and the third basic unit may be connected, or the first basic unit, the second basic unit, and the third basic unit may be spaced by bits. A function or rule of the bits for spacing the first basic unit, the second basic unit, and the third basic unit is not limited in the embodiments.

It can be further understood that, the location of the third bit in the basic unit, the organization sequence of the basic units, or whether there is a spacing between the basic units may be agreed on in advance by both communications parties, or the location of the third bit in the basic unit, the organization sequence of the basic units, and the organization sequence of the basic units are indicated by a sender to a receiver in a manner.

Optionally, the first indication information further includes the first value indicating the location. The first value is used to indicate a quantity of basic units that are included in the value of the first packet header information, and the third bit in the basic unit is used to indicate whether the basic unit is the value of the first packet header information.

For example, the first value indicates the quantity of basic units that are included in the value of the first packet header information, and the third bit in the basic unit is identification information and indicates whether the basic unit is the value of the first packet header information. FIG. 4 shows a format of the value of the first packet header information according to the embodiments. In FIG. 4, it is assumed that the first packet header information is a destination address 0x123456, a length of the basic unit is one byte, and the first bit in the basic unit is the third bit. The address 0x123456 is converted into binary 1 0010 0011 0100 0101 0110. A quantity of bits of the first value may be agreed on in advance. Three bits are used as an example in this embodiment. Therefore, three bits and three basic units are required for encoding the destination address. The three bits are 011, and indicate that the value of the first packet header information includes three basic units. The first basic unit is 11001000, and the first bit in the first basic unit is 1 and is used to indicate that the first basic unit is the value of the first packet header information. The second basic unit is 11101000, and the first bit in the second basic unit is 1 and is used to indicate that the second basic unit is the value of the first packet header information. The third basic unit is 11010110, and the first bit in the third basic unit is 1 and is used to indicate that the third basic unit is the value of the first packet header information.

Optionally, a quantity of bits of the $i^{th}$ basic unit is the same as a quantity of bits of the $(i+1)^{th}$ basic unit; or a quantity of bits of the $i^{th}$ basic unit and a quantity of bits of the $(i+1)^{th}$ basic unit are increased or decreased based on a predetermined step in an arrangement sequence of the basic units.

For example, the quantities of bits of the basic units may be the same. In other words, the quantity of bits of each basic unit is the same, as described in FIG. 3 and FIG. 4. The quantity of bits of each basic unit may alternatively be different. For example, the quantity of bits of each basic unit is increased or decreased based on the predetermined step in the arrangement sequence of the basic units. For example, through definition, a step value is 1, the first basic unit includes eight bits, the second basic unit includes nine bits, and the third unit includes 10 bits. In other words, compared with the $i^{th}$ basic unit, the $(i+1)^{th}$ basic unit is increased by one step.

It can be understood that how to control the quantity of bits included in the basic unit is not limited in the embodiments. For example, the quantity of bits included in the basic unit may be agreed on in advance, or indication information may be added to the network layer data packet header, to indicate the quantity of bits included in the basic unit carrying the value of the first packet header information.

It can be further understood that an increased step value or a decreased step value between the $i^{th}$ basic unit and the $(i+1)^{th}$ basic unit may be agreed on in advance, or indication information may be added to the network layer data packet header, to indicate a step value between the $i^{th}$ basic unit and the $(i+1)^{th}$ basic unit. This is not limited in the embodiments.

Optionally, when a value of the first indication information is in a first interval, the first indication information is the value of the first packet header information; or when a value of the first indication information is in a second interval, the first indication information is used to indicate the location of the value of the first packet header information.

Optionally, a value in the first interval is less than or equal to a first threshold, and a value in the second interval is greater than the first threshold.

Optionally, when the first indication information is greater than the first threshold, the first indication information and the first threshold jointly indicate that the first indication information is used to indicate the location of the value of the first packet header information.

For example, the first indication information may implicitly indicate the value of the first packet header information. When the first indication information is less than or equal to the first threshold, the first indication information is the value of the first packet header information. When the first indication information is greater than the first threshold, the first indication information is used to indicate the location of the value of the first packet header information.

For example, it is agreed that four bits carry the first indication information, and the first threshold is 6, namely, 0110. When the first indication information is less than or equal to 6, the first indication information is the value of the first packet header information. For example, when the first indication information is 0100, it indicates that the value of the first packet header information is 0100. When the first indication information is 0111, the first indication information indicates that the value of the first packet header information is carried in a next connected byte. For another example, when the first indication information is 1000, the first indication information indicates that the value of the first packet header information is carried in next two connected bytes.

It can be understood that how the first indication information and the first threshold indicate the location of the first packet header information is not limited in the embodiments.

Therefore, in this embodiment, the location of the device address in the network layer data packet does not need to be fixed. Therefore, flexibility becomes stronger, and an address length can be flexibly increased as required. This can resolve a problem of an insufficient address length, and can also resolve bandwidth and memory overheads caused by an excessively long address. For example, in an IoT scenario of less than 60000 nodes, a 128-bit address is not required, and the address needs to be only 16-bit. If the IPv6 protocol is used, a 128-bit address is inevitably used, causing high bandwidth overheads and memory overheads. In this embodiment, an address length may not be fixed, and flexibly vary as required, thereby reducing bandwidth overheads and memory overheads.

Optionally, the first indication information includes a first value indicating the location of the value of the first packet header information, and the first value includes S consecutive bits, where $S \geq 1$.

Optionally, the first packet header further includes second indication information, the second indication information includes a second value indicating a location of the first value, the second value is used to indicate a quantity of the S consecutive bits or a quantity of basic units, and the basic unit is used to carry the S consecutive bits.

For example, the first packet header includes the first indication information, the second indication information, and the first packet header information. The first indication information is used to indicate the location of the value of the first packet header information, and the second indication information includes the second value indicating the location of the first indication information. The second value may indicate the quantity of the S consecutive bits. If the first indication information includes three consecutive bits, the first indication information is 3. The second value may alternatively indicate the quantity of basic units carrying the S consecutive bits. The basic unit is a set including bits. For example, the basic unit includes two bits, and the value of the first indication information is 1010. Therefore, two basic units are required for carrying the first packet header information, and the second value is 2.

For example, FIG. 5 shows a format of the value of the first packet header information according to the embodiments. In FIG. 5, the first packet header information includes the first indication information, the second indication information, and the first packet header information. The second indication information is agreed to be two bits, the first indication information is agreed to be two bits, and the second indication information, the first indication information, and the value of the first packet header information are arranged in sequence. The first packet header information is the destination address 1 0010 0011 0100 0101 0110. The first indication information is 11, indicating that the value of the first packet header information includes three basic units. A length of the basic unit is one byte. The second indication information is 10, and the second indication information is used to indicate that the first indication information includes two bits. A code of the value of the first packet header information is 0001 0010 0011 0100 0101 0110.

Optionally, the second value includes D fourth bits. The D consecutive fourth bits are located before the S consecutive bits, and/or the D consecutive fourth bits are located after the S consecutive bits, where D≥1.

For example, for a specific location relationship between the D consecutive fourth bits and the S consecutive bits, refer to related descriptions of the M first bits and the N consecutive bits. To avoid repetition, details are not described herein.

Optionally, the first value includes $S_j$ consecutive fourth bits and $S_{j+1}$ consecutive fifth bits, where j≥1;

second indication information includes sixth bits, and the second indication information includes a location indicating the first indication information; and the sixth bits are located before the $S_j$ consecutive fourth bits, between the $S_j$ consecutive fourth bits and the $S_{j+1}$ consecutive fifth bits, and/or after the $S_{j+1}$ consecutive fifth bits.

For example, the $S_j$ consecutive fourth bits are not connected to the $S_{j+1}$ consecutive fifth bits, and the sixth bit or other indication information may be between the $S_j$ consecutive fourth bits and the $S_{j+1}$ consecutive fifth bits.

It can be understood that, when the sixth bit is located before the $S_j$ consecutive fourth bits, and/or after the $S_{j+1}$ consecutive second bits, other information may further be included between the $S_j$ consecutive fourth bits and the $S_{j+1}$ consecutive fifth bits. The other information is not limited in the embodiments.

Optionally, a $j^{th}$ basic unit includes the $S_j$ consecutive fourth bits and the sixth bit before the $S_j$ consecutive fourth bits, and a $(j+1)^{th}$ basic unit includes the $S_{j+1}$ consecutive fifth bits and the sixth bit before the $S_{j+1}$ consecutive fifth bits.

Optionally, the sixth bit in the $j^{th}$ basic unit is used to indicate whether a next basic unit connected to the $j^{th}$ basic unit is the $(j+1)^{th}$ basic unit.

Optionally, the L field included in the first packet header information includes the $j^{th}$ basic unit and the $(j+1)^{th}$ basic unit.

Figure 6:
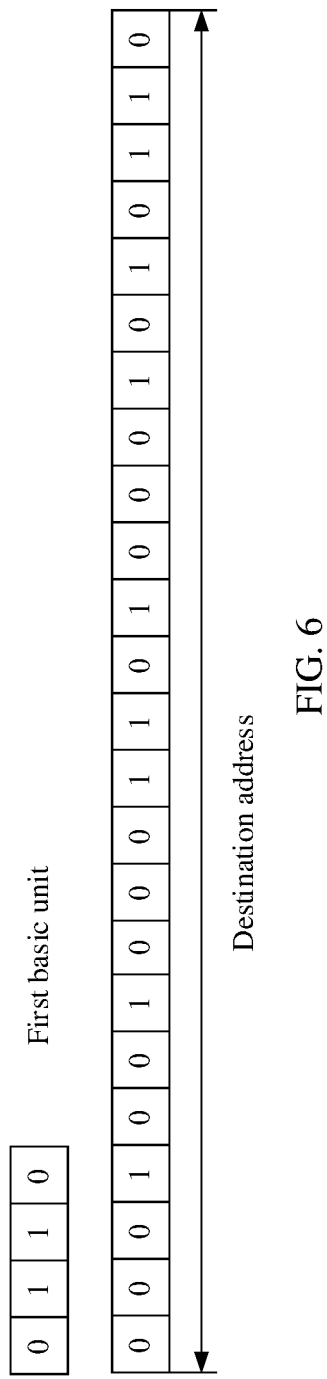
FIG. 6 shows a format of a value of first packet header information according to an embodiment.

For example, the sixth bit is identification information, and indicates whether the next basic unit of the $j^{th}$ basic unit is the $(j+1)^{th}$ basic unit. FIG. 6 shows a format of the value of the first packet header information according to the embodiments. In FIG. 6, it is assumed that the first packet header information is the destination address 0x123456, and the basic unit includes four bits. The address 0x123456 is converted into binary 1 0010 0011 0100 0101 0110. Therefore, six basic units are required for encoding the destination address. The value of the first indication information is 6, and the first basic unit is 0110. The first bit in the first basic unit is 0 and is used to indicate that a next basic unit no longer carries the first indication information. In other words, the first indication information ends at the first basic unit.

Figure 7:
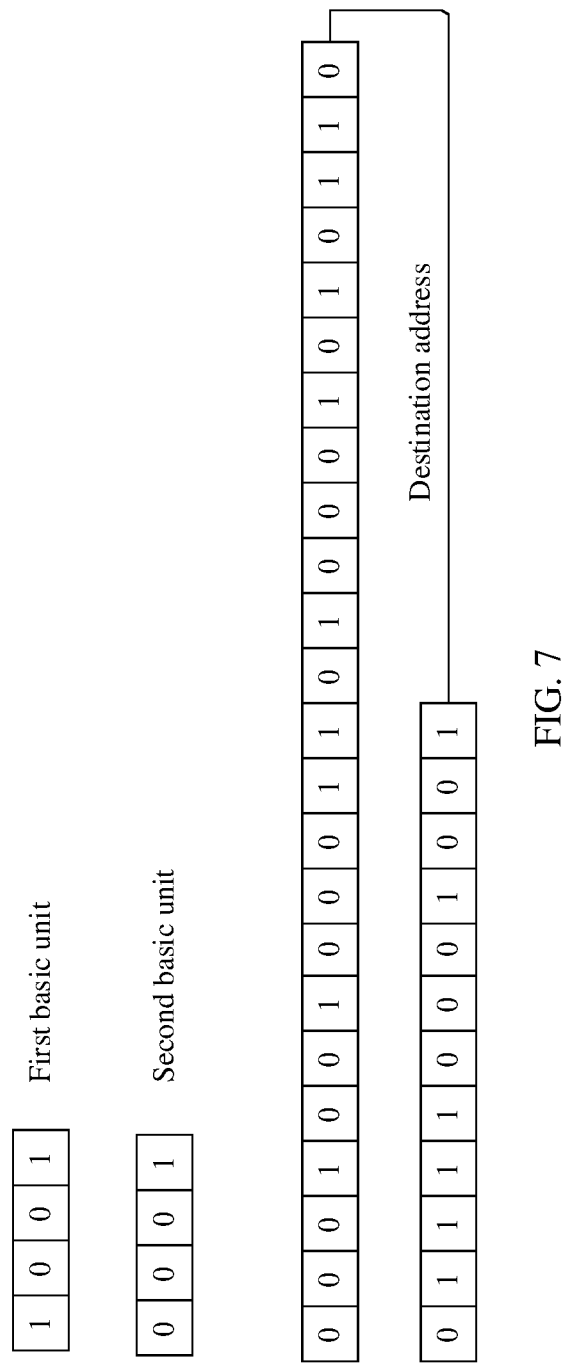
FIG. 7 shows a format of a value of first packet header information according to an embodiment.

FIG. 7 shows a format of a value of first packet header information according to an embodiment. In FIG. 7, it is assumed that the first packet header information is a source address 0x123456789, which is converted into binary 1 0010 0011 0100 0101 0110 0111 1000 1001, and the basic unit includes four bits. Therefore, nine basic units are required for encoding the source address. The value of the first indication information is 9, and the first basic unit is 1001. The first bit in the first basic unit, namely, the sixth bit, is 1 and is used to indicate that a next basic unit adjacent to the first basic unit is a second basic unit. The second basic unit is 0001, and the first bit in the second basic unit, namely, the sixth bit, is 0 and is used to indicate that a next basic unit no longer carries the destination address. In other words, the destination address ends at the second basic unit.

It can be understood that a location of the sixth bit in the basic unit is not limited in the embodiments. The sixth bit may be located in the first bit of the basic unit, or may be located in the last bit of the basic unit, or may be located in a middle bit of the basic unit. Alternatively, the location of the third bit in the basic unit may be increased or decreased based on an agreed step. For example, in the two basic units in FIG. 7, the sixth bit is in the second bit of the second basic unit, and the sixth bit is in the third bit of the second basic unit. For example, the first basic unit is 0101, and the second basic unit is 0001.

It can be further understood that a quantity of bits used to carry the sixth bit in the basic unit is not limited in the embodiments either. For example, in the basic unit, two bits may further be used to carry the sixth bit. For example, in the $j^{th}$ basic unit, 11 is used to indicate that the next basic unit connected to the $j^{th}$ basic unit is the $(j+1)^{th}$ basic unit, and 00 is used to indicate that the next basic unit connected to the $j^{th}$ basic unit is not the $(j+1)^{th}$ basic unit.

It can be further understood that the organization sequence of the plurality of basic units indicating the value of the first packet header information is not limited in the embodiments. For example, in the foregoing descriptions, in FIG. 7, the value of the first indication information is 9, the value of the first indication information requires two 4-bit basic units, the first basic unit is 1001, and the second basic unit is 0001. Alternatively, content of the first indication information carried by the first basic unit and content of the first indication information carried by the second basic unit may be mutually exchanged. In other words, the organization sequence of the value of the first packet header information may be the first basic unit+the second basic unit, or may be the second basic unit+the first basic unit.

It can be further understood that the basic units may be consecutive or may be inconsecutive. For example, in the foregoing description, the first basic unit and the second basic unit may be connected, or the first basic unit and the second basic unit may be spaced by a bit. A function or rule of the bit for spacing the first basic unit and the second basic unit is not limited in the embodiments.

It can be further understood that, the location of the sixth bit in the basic unit, the organization sequence of the basic units, and whether there is a spacing between the basic units may be agreed on in advance by both communication parties, or the location of the third bit in the basic unit and the organization sequence of the basic units are indicated by the sender to the receiver in a manner.

Optionally, a quantity of bits of the basic unit carrying the second value and a quantity of bits of the basic unit carrying the first value may be different from a quantity of bits of the basic unit carrying the value of the first packet header information.

For example, the destination address 0x123456 is still used as an example for description. If it is agreed that a length of a basic unit 1 carrying the destination address is one byte, the destination address requires three basic units 1. The value of the first indication information is 3. It is agreed that a basic unit 2 carrying the first indication information includes four bits, and the first basic unit is 0011. The first bit in the first basic unit is 0, and is used to indicate that a next basic unit no longer carries the destination address. In other words, the destination address ends at the first basic unit.

Optionally, the basic unit carrying the second value and the basic unit carrying the first value may be connected or may not be connected. As shown in FIG. 6, the first basic unit in FIG. 6 may be or may not be connected to the basic unit carrying the destination address. Similarly, the first basic unit and the second basic unit in FIG. 7 may be or may not be connected to the basic unit carrying the destination address.

For example, whether the basic unit carrying the second value is connected to the basic unit carrying the first value may be agreed on in advance by both communication parties, or whether the basic unit carrying the second value is connected to the basic unit carrying the first value may be indicated by the sender to the receiver in a manner.

Optionally, the second indication information further includes the second value indicating the location, the second value is used to indicate a quantity of basic units that are included in the first indication information, and the sixth bit in the $j^{th}$ basic unit is used to indicate whether the $j^{th}$ basic unit is the value of the first indication information.

For example, the first value indicates the quantity of basic units that are included in the value of the first packet header information, and the third bit in the basic unit is identification information and indicates whether the basic unit is the value of the first packet header information. The destination address 0x123456 is still used as an example for description. If it is agreed that a length of the basic unit 1 carrying the destination address is one byte, the destination address requires three basic units 1. The value of the first indication information is 3. It is agreed that the basic unit 2 carrying the first indication information includes four bits, and the basic unit is 1011. The first bit in the basic unit is 1, and is used to indicate that a next basic unit is the value of the first indication information.

Optionally, a quantity of bits of the $j^{th}$ basic unit is the same as a quantity of bits of the $(j+1)^{th}$ basic unit; or a quantity of bits of the $j^{th}$ basic unit and a quantity of bits of the $(j+1)^{th}$ basic unit are increased or decreased based on a predetermined step in an arrangement sequence of the basic units.

It can be understood that, for specific descriptions of the quantities of bits of the $j^{th}$ basic unit and the $(j+1)^{th}$ basic unit, refer to related descriptions of the quantities of bits of the $i^{th}$ basic unit and the $(i+1)^{th}$ basic unit. To avoid repetition, the quantities of bits of the $j^{th}$ basic unit and the $(j+1)^{th}$ basic unit are not described herein.

Optionally, when a value of the second indication information is in a third interval, the first indication information is the value of the first indication information; or when a value of the second indication information is in a fourth interval, the first indication information is used to indicate a location of the value of the first indication information.

Optionally, a value in the third interval is less than or equal to a second threshold, and a value in the fourth interval is greater than the second threshold.

Optionally, when the second indication information is greater than the first threshold, the second indication information and the second threshold jointly indicate the location of the value of the first indication information.

For example, the first indication information may implicitly indicate the value of the first packet header information. When the first indication information is less than or equal to the first threshold, the first indication information is the value of the first packet header information. When the first indication information is greater than the first threshold, the first indication information is used to indicate the location of the value of the first packet header information.

For example, it is agreed that three bits carry the first indication information, and the first threshold is 4, namely, 100. When the second indication information is less than or equal to 4, the second indication information is the value of the indication information. For example, when the second indication information is 010, it indicates that the value of the first indication information is 010. When the second indication information is 110, the second indication information indicates that the value of the indication information is carried in next two connected bytes.

It can be understood that how the second indication information and the second threshold indicate the location of the first packet header information is not limited in the embodiments.

Optionally, the first packet header further includes third indication information and a type of the first packet header information, and the third indication information is used to indicate a location of the type of the first packet header information.

Figures 8, 9:
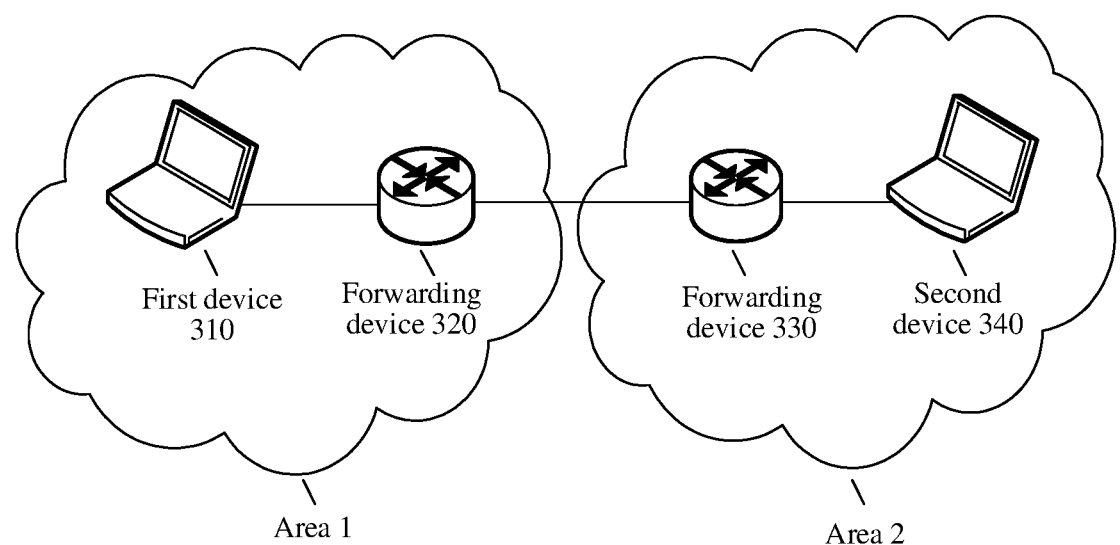
FIG. 8 shows an example of a definition of a type of first packet header information according to v.
FIG. 9 is a schematic diagram of an application scenario according to an embodiment.

For example, the first packet header includes the type of the first packet header information and the value of the first packet header information. Alternatively, the first packet header includes the type of the first packet header information, a length of the first packet header information, and the value of the first packet header information. FIG. 8 shows an example of a definition of the type of first packet header information according to an embodiment. In FIG. 8, 001 indicates a destination address, 002 indicates a source address, and 003 indicates a hop limit. In this case, when the type of the first packet header information carried in the first packet header is 001, it indicates that the first packet header information is the destination address.

With reference to the first basic unit (the first basic unit carries a quantity of basic units included in the destination address) and the destination address in FIG. 6, and with reference to a type value of the destination address in FIG. 8, a code is 00101100010010001101000101010110 when the first packet header information is the destination address.

Because the type of the first packet header information is added to the first packet header, a sequence of a plurality of pieces of first packet header information does not need to be agreed on in advance, and the first packet header information may be flexibly and variably selected. For example, the first packet header information may be selected based on a service requirement.

Optionally, the third indication information may be referred to as a type field.

Optionally, the first packet header information includes a T field, the L field and the V field, or the first packet header information includes a T field and the V field. The T field is used to indicate a type of the V field, and the L field is used to indicate the location of the V field.

Optionally, a sequence of the T field, the L field, and the V field in the first packet header information is not limited in the embodiments. For example, the sequence may be the T field, the L field, and the V field, or the sequence may be the V field, the L field, and the T field, or the sequence may be the T field, the V field, and the L field.

For example, the sequence of the T field, the L field, and the V field may be agreed on in advance by both communication parties, or the sequence of the T field, the L field, and the V field may be indicated by the sender to the receiver in a manner.

It can be understood that the T field, the L field, and the V field may be or may not be connected.

For example, whether the T field, the L field, and the V field are connected may be agreed on in advance by both the communication parties, or whether the T field, the L field, and the V field are connected may be indicated by the sender to the receiver in a manner.

Optionally, the type of the first packet header information includes Z consecutive bits, where $Z \geq 1$.

Optionally, the third indication information includes a third value indicating the location of the type of the first packet header information, the third value is used to indicate a quantity N of the Z consecutive bits or a quantity of basic units, and the basic unit is used to carry the Z consecutive bits.

Optionally, a width of the bits carrying the third indication information is fixed; or a length of the basic unit carrying the third indication information is fixed.

Optionally, a quantity of bits of the basic unit carrying the third value and the quantity of bits of the basic unit carrying the first value may be different from the quantity of bits of the basic unit carrying the value of the first packet header information.

Optionally, the third value includes X seventh bits. The X seventh bits are located before the Z consecutive bits, and/or the X seventh bits are located after the Z consecutive bits, where $X \geq 1$.

Optionally, the type of the value of the first packet header information includes $Z_k$ consecutive seventh bits and $Z_{k+1}$ consecutive eighth bits, where $k \geq 1$;

the first indication information includes ninth bits; and the ninth bits are located before the $Z_k$ consecutive seventh bits, between the $Z_k$ consecutive seventh bits and the $Z_{k+1}$ consecutive eighth bits, and/or after the $Z_{k+1}$ consecutive eighth bits.

For example, the $Z_k$ consecutive seventh bits are not connected to the $Z_{k+1}$ consecutive eighth bits, and the ninth bit or other indication information may be between the $Z_k$ consecutive seventh bits and the $Z_{k+1}$ consecutive eighth bits.

It can be understood that, when the ninth bit is located before the $Z_k$ consecutive seventh bits, and/or after the $Z_{k+1}$ consecutive eighth bits, other indication information may further be included between the $Z_k$ consecutive seventh bits and the $Z_{k+1}$ consecutive eighth bits. Other information is not limited in the embodiments.

Optionally, a $k^{th}$ basic unit includes the $Z_k$ consecutive seventh bits and the ninth bit before the $Z_k$ consecutive seventh bits, and a $(k+1)^{th}$ basic unit includes the $Z_{k+1}$ consecutive eighth bits and the ninth bit before the $Z_{k+1}$ consecutive eighth bits.

Optionally, the V field included in the first packet header information includes the $k^{th}$ basic unit and the $(k+1)^{th}$ basic unit.

Optionally, the ninth bit in the $k^{th}$ basic unit is used to indicate whether a next basic unit connected to the $k^{th}$ basic unit is the $(k+1)^{th}$ basic unit.

Optionally, the third indication information further includes the third value indicating the location of the type of the value of the first packet header information. The third value is used to indicate a quantity of basic units, and the ninth bit in the $k^{th}$ basic unit is used to indicate whether the $k^{th}$ basic unit is the value of the first packet header information.

It can be understood that, for specific descriptions of the ninth bits in the $k^{th}$ basic unit and the $(k+1)^{th}$ basic unit, correspondingly refer to descriptions of the third bits in the $i^{th}$ basic unit and the $(i+1)^{th}$ basic unit or descriptions of the sixth bits in the $j^{th}$ basic unit and the $j+1)^{th}$ basic unit. To avoid repetition, details are not described herein.

Optionally, a quantity of bits of the $k^{th}$ basic unit is the same as a quantity of bits of the $(k+1)^{th}$ basic unit; or a quantity of bits of the $k^{th}$ basic unit and a quantity of bits of the $(k+1)^{th}$ basic unit are increased or decreased based on a predetermined step in an arrangement sequence of the basic units.

It can be understood that, for specific descriptions of the quantities of bits of the $k^{th}$ basic unit and the $(k+1)^{th}$ basic unit, refer to related descriptions of the quantities of bits of the $i^{th}$ basic unit and the $(i+1)^{th}$ basic unit or descriptions of the quantities of bits of the $j^{th}$ basic unit and the $(j+1)^{th}$ basic unit. To avoid repetition, the quantities of bits of the $k^{th}$ basic unit and the $(k+1)^{th}$ basic unit are not described herein.

Optionally, when a value of the third indication information is in a fifth interval, the first indication information is the type of the first packet header information; or when a value of the first indication information is in a sixth interval, the first indication information is used to indicate the location of the type of the first packet header information.

Optionally, a value in the fifth interval is less than or equal to a third threshold, and a value in the sixth interval is greater than the third threshold.

Optionally, when the third indication information is greater than the third threshold, the third indication information and the third threshold jointly indicate the type of the first packet header information.

It can be understood that, for related descriptions of the third indication information and the type of the first packet header information, refer to corresponding descriptions of the first indication information and the value of the first packet header information. Details are not described herein.

In a plurality of IoT scenarios, a field in an IPv6 common header may be useless. For example, a traffic class traffic class and a flow label flow label in the IPv6 common header may not be required, but still have to be present. Therefore, a 128-bit address and fields in the common packet in the IPv6 protocol increase bandwidth overheads and memory overheads. In addition, because a sequence of and sizes of the fields in the common packet of the IPv6 protocol are fixed, it is extremely difficult to delete or add a field. In this embodiment, the indication information indicating the type of the first packet header is added to in the first packet header, so that the sequence of the first packet header information can be flexible and variable. Alternatively, the first packet header information may be present as required, to avoid useless first packet header information.

Optionally, in 202, that the first device processes the network layer data packet includes: The first device sends the network layer data packet to an intermediate node; or the first device parses the network layer data packet and determines whether to forward the network layer data packet.

For example, when the first device is a source device, the first device sends the network layer data packet to the intermediate node; or when the first device is an intermediate device or a destination device instead of a source device, the first device parses the network layer data packet and determines whether to forward the network layer data packet.

Before both communication parties perform communication, both the communication parties may agree on an encoding scheme in advance. Therefore, when receiving the network layer data packet, the first device may parse the network layer data packet according to an agreement. The agreed encoding scheme includes any one of the foregoing implementations, for example, the quantity of bits of the basic unit, whether the basic units are consecutive, the locations of the third bit, the sixth bit, and the ninth bit, and the organization sequence of the basic units. For example, if the encoding scheme is the first indication information and the value of the first packet header information, in other words, both the communication parties have agreed on a sequence of the plurality of pieces of first packet header information in the first packet header, the second device needs to determine the type of the first packet header information based on only the sequence of the first packet header information. The second device first parses the first indication information, and then parses the value of the first packet header information according to the first indication information. If the encoding scheme is the first indication information, the third indication information, and the value of the first packet header information, both the communication parties do not agree on a sequence of the plurality of pieces of first packet header information in the first packet header, and the second device needs to determine the type of the first packet header information according to the third indication information, and parse the value of the first packet header information according to the first indication information.

It can be understood that the sender may further send indication information to notify the receiver of the encoding scheme used by the sender.

Optionally, that the first device parses the network layer data packet, and determines whether to forward the network layer data packet includes:

when the first device is a destination device of the network layer data packet, the first device transmits the parsed network layer data packet to a central processing unit CPU of the first device; or when the first device is not a destination device of the network layer data packet, the first device forwards the network layer data packet according to a forwarding information table and/or a forwarding policy.

For example, the first device determines whether to forward the network layer data packet based on a destination address carried at the network layer. If the destination address is not an address of the first device, a forwarding process is performed. The first device checks whether the first device is configured with a forwarding policy. If the first device is not configured with the forwarding policy, the first device performs forwarding directly based on the destination address and the forwarding information table (FIB). If the first device is configured with a corresponding forwarding policy, the first device continues parsing a subsequent semantic field until a forwarding policy is matched, and performs forwarding according to the forwarding policy.

Corresponding processing is performed on a packet according to the configuration policy and a corresponding option field obtained through parsing, and then a next policy continues to be matched.

The forwarding policy includes but is not limited to: filtering a packet based on an access control list (ACL), arranging a quality of service (QoS) policy based on a traffic type, and adding or deleting the corresponding option field or adjusting a sequence of related fields based on a type of a data packet and a function of the data packet, to perform processing on a next hop.

The first device may adjust, add, or delete some first packet header information based on a requirement and a change. For example, when a value of first packet header information changes, the value of the first packet header information is re-encoded and encapsulated, and then forwarded according to the FIB table.

When the destination address of the network layer data packet is the address of the first device, the first device receives the data packet, parses other first packet header information and payload in the data packet, and sends the other first packet header information and the payload to the CPU for processing.

The method 200 may be applied to a plurality of scenarios such as inter-domain communication and source routing. The following describes a scenario to which the method 200 can be applied.

FIG. 9 is a schematic diagram of an application scenario according to an embodiment. In FIG. 9, a first device 310 and a second forwarding device 320 belong to an area 1, and a forwarding device 330 and a second device 340 belong to an area 2. When sending a network layer data packet, the second device encodes and encapsulates identification information of the first device and the second device, other first packet header information, and a payload by using an encoding scheme in the method 200, and then sends an encoded and encapsulated network layer data packet to the forwarding device. After receiving the packet, the forwarding device decodes an address according to a corresponding decoding scheme, then decodes a field in the other first packet header information and matches a related policy, modifies the network layer data packet, re-encodes and re-encapsulates the network layer data packet, and finally forwards the network layer data packet to the second device according to a FIB table. The second device receives the network layer data packet, decodes the address according to the decoding scheme in the method 200, finds that the destination address is the second device, decodes all subsequent content, and sends all the content to a CPU for processing.

Figure 10:
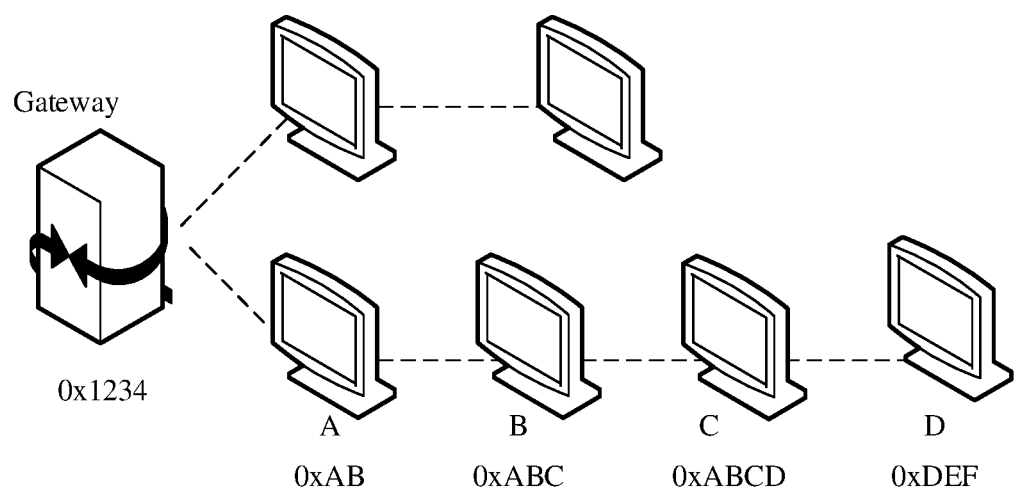
FIG. 10 is a schematic diagram of an application scenario according to an embodiment.

FIG. 10 is a schematic diagram of an application scenario according to an embodiment. In FIG. 10, a gateway GW needs to send a message to a node D in a source routing source routing manner. If address formats of a node A, a node B, and a node C are different, for example, a quantity of bits of each address is different, an address of the node A is 0xAB, an address of the node B is 0xABC, an address of the node C is 0xABCD, and an address of the node D is 0xDEF, source routing cannot be supported in the prior art. The method 200 supports an address in any format, so that the addresses of the nodes A, B, and C in a source routing address list can be indicated, and source routing including addresses in different formats is compatible.

Figure 11:
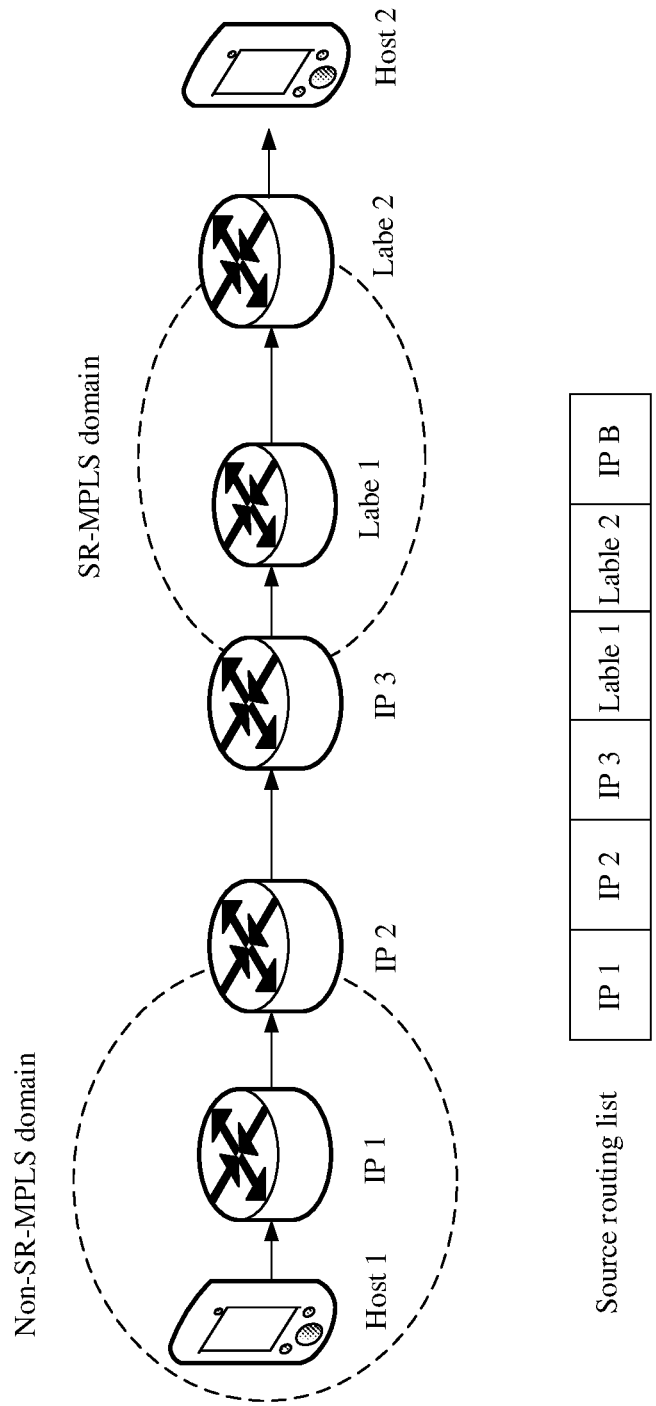
FIG. 11 is a schematic diagram of an application scenario according to an embodiment.

FIG. 11 is a schematic diagram of an application scenario according to an embodiment. In FIG. 11, a host 1, a forwarding device IP 1, and a forwarding device IP 2 are nodes in a non-segment routing-multi-protocol label switching ( ) domain, and a common IP address is used as a node identifier in the non-SR-MPLS domain. A forwarding device IP 3, a forwarding device label 1, and a forwarding device label 2 are nodes in an SR-MPLS domain, and an MPLS label is used as a node identifier in the SR-MPLS domain, and a host 2 uses a common IP address as a node identifier. Data sent by the host 1 carries source routing information, and nodes on a source routing path include a node that uses the common IP address as the identifier and that is in the non-SR-MPLS domain and a node that uses the MPLS label as the identifier and that is in the SR-MPLS domain. The method in these embodiments may be used to encapsulate identification information of all path nodes in a source routing list. Although the identification information of the nodes is of different types, the identification information of each node needs to be indicated in the SR list by using the method 200.

Figure 12:
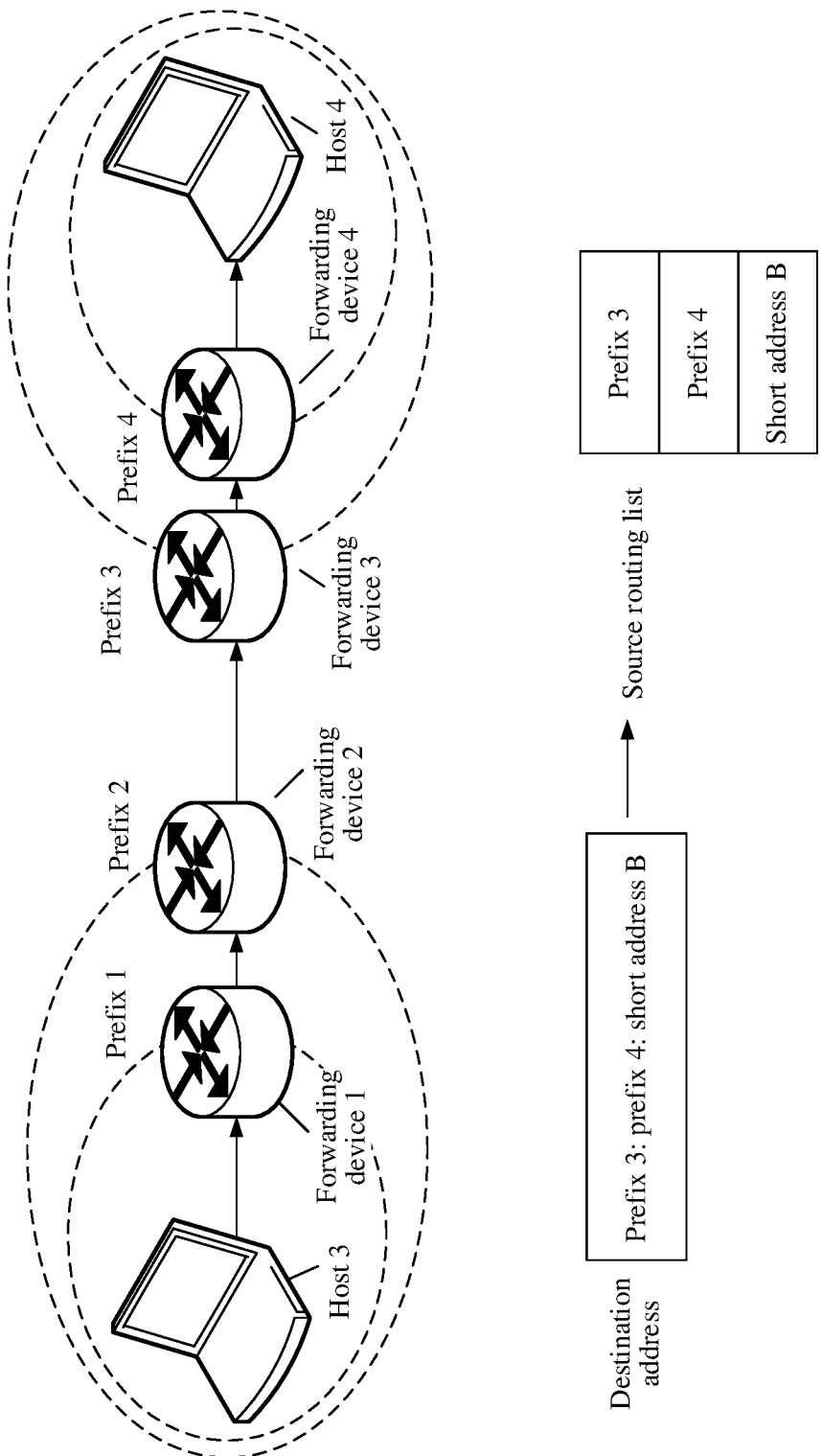
FIG. 12 is a schematic diagram of an application scenario according to an embodiment.

FIG. 12 is a schematic diagram of an application scenario according to an embodiment. In FIG. 12, a host 3 communicates with a host 4 by using a forwarding device 1, a forwarding device 2, a forwarding device 3, and a forwarding device 4. A host A and a host B each use an intra-domain short address as an identifier of the host in an autonomous system domain of the host, and a gateway (a forwarding device) adds a prefix to the short address of the host when the host leaves the domain. For example, the forwarding device 1 adds a prefix 1 to a short address of the host 3, and the forwarding device 2 adds a prefix 2 to the address to which the prefix 1 has been added by the host 3. In a common IP forwarding mode, the host 3 performs forwarding by using a global address of the host 4 as a destination address, and the global address of B includes a prefix of B and a short address, for example, prefix 3: prefix 4: short address B. In the embodiments, forwarding in a source routing mode may be supported by using the method 200. All prefixes of B and the short address of B each are a single element in a source routing list. During forwarding, forwarding is performed by separately using the prefix 3, the prefix 4, and the short address B as the destination address. According to the method 200, hierarchical destination addresses are indicated as a source routing list, and a common IP address forwarding function is implemented by using a source routing technology.

Figure 13A:
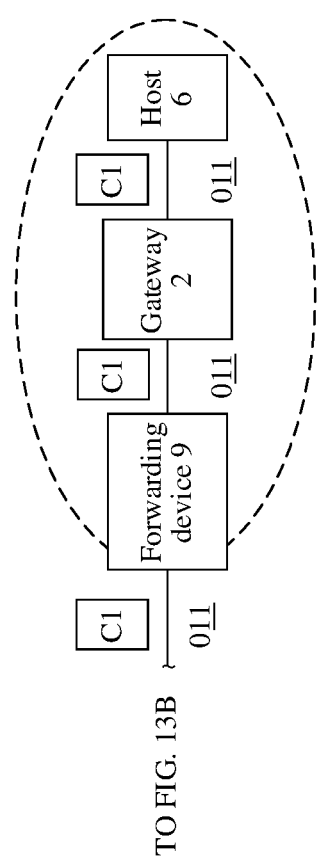
FIG. 13A is a schematic diagram of an application scenario according to an embodiment.
Figure 13B:
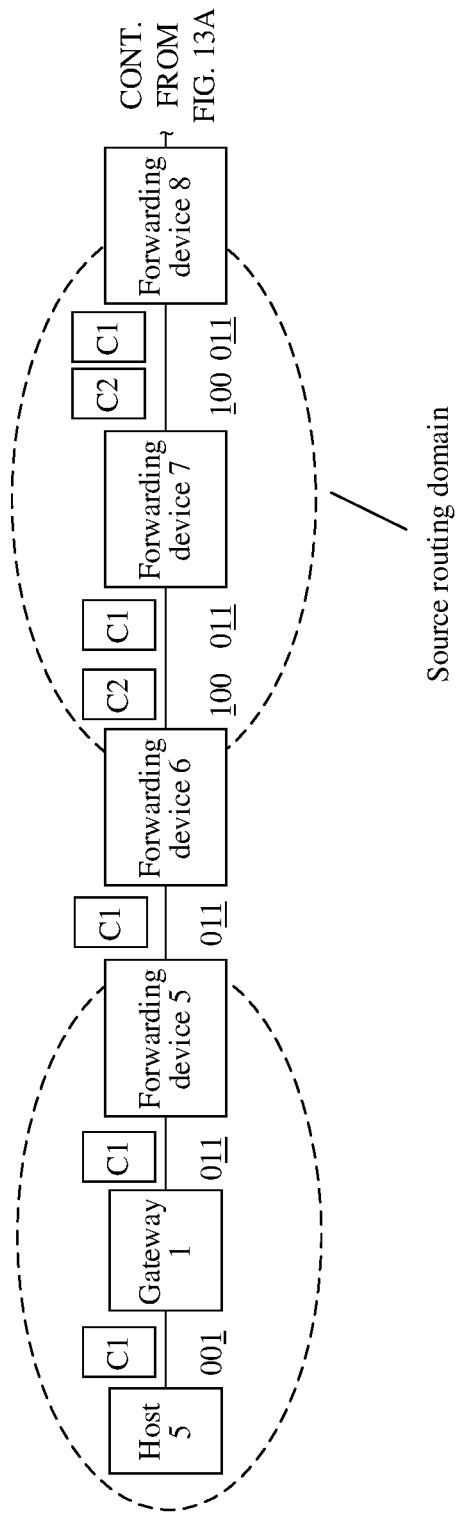
FIG. 13B is a schematic diagram of an application scenario according to an embodiment.
Figure 14:
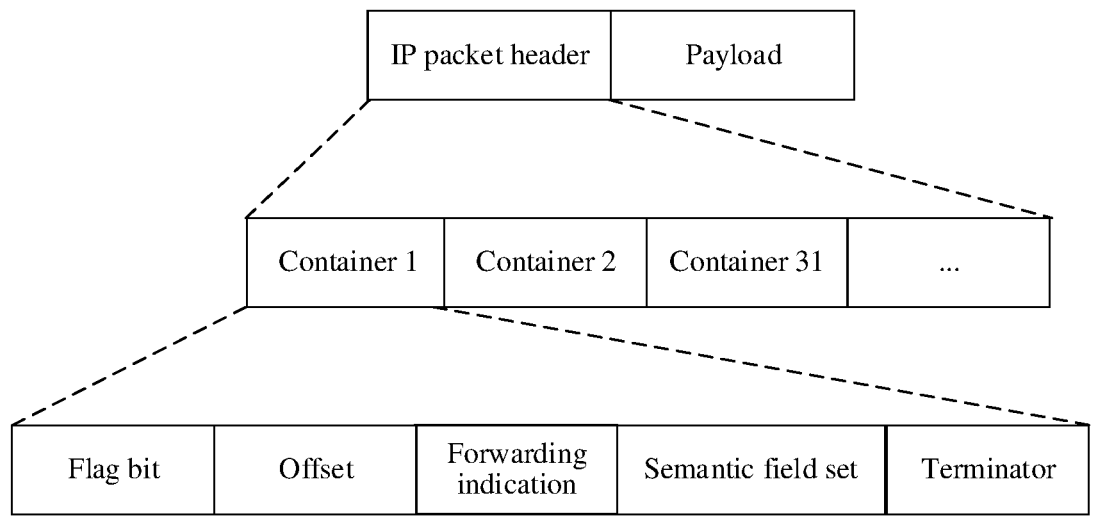
FIG. 14 is a schematic diagram of a new packet format according to an embodiment.

FIG. 13A and FIG. 13B are schematic diagrams of an application scenario according to an embodiment. Before the scenario shown in FIG. 13A and FIG. 13B is described, a possible new packet format is first described. The new packet format is shown in FIG. 14. The packet includes an IP header and a payload. A packet header part of the IP header includes one or more containers. A container may be considered as a special field. A quantity of containers may be increased. The quantity of containers may be indicated in any manner in the method 200.

Each container may include several types of information such as a flag bit, an offset, a forwarding indication, a semantic field set, and a terminator.

The offset directly points to the first bit of a next container, and if there is no next container, points to a start bit of the payload.

The forwarding indication is used to guide a forwarding device to perform forwarding. Main functions are to indicate a semantic purpose of a current container and a combination manner based on the purpose, to provide more usage possibilities and space for semantic free combination. Alternatively, the forwarding indication may be used to guide, according to a specific technology, a forwarding device to complete an operation such as POP, PUSH, or SWAP on a data packet. An expression form may be a bitmap, and the bitmap expressing the forwarding indication has a variable length. A specific length of the bitmap may be implemented by using any method described in the embodiments.

The semantic field set is a set of information included in the IP packet header. Each semantic field may be encapsulated and parsed by using the method in the embodiments. A combination manner, a semantic explanation, and a usage method of a plurality of semantic fields are determined by a forwarding indication field.

Figure 15:
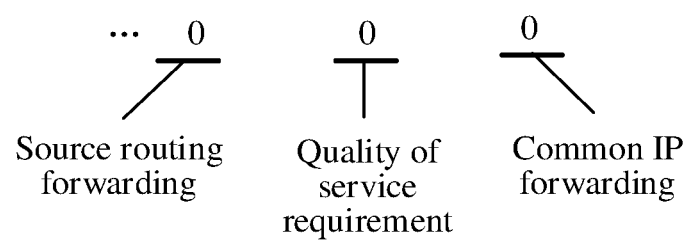
FIG. 15 is a schematic diagram of forwarding indications according to an embodiment.

How to use the forwarding indication is described below by using an example. A bitmap form is used as an example. In the forwarding indication field, one bit indicates one forwarding indication. In this example, three types of forwarding indications are used as an example for description: source routing, QoS, and common IP forwarding, as shown in FIG. 15. When the source routing is 1, it indicates that the current container includes source routing information, and forwarding needs to be performed in a source routing manner. When the QoS is 1, it indicates that the current container includes a QoS information related field, and a QoS policy needs to be considered during forwarding. When the common IP forwarding is 1, it indicates that forwarding is performed according to a common IP.

In FIG. 13A and FIG. 13B, when a packet is sent from a host 5, the packet has been encapsulated according to the packet format in FIG. 14, and includes only one container C1. A forwarding indication includes common IP forwarding, a corresponding bit location of the common IP forwarding is 1, and the forwarding indicator in the container C1 is 001. An IP address field and another field are also encapsulated in the "semantic field set" by using a method in the embodiments. If the flag bit of the container is set to 0, it indicates that the current container is the last container.

After receiving the packet, a gateway 1 parses an offset field and a forwarding indication field according to the method in the embodiments, to obtain corresponding valid value information. Then, the gateway 1 parses a "semantic field set" according to the indication information, to obtain corresponding semantic field information. If considering that data of the packet has a QoS requirement, the GW 1 sets a corresponding bit set to 1 in the forwarding indication field, so that a forwarding indication in the container C1 is 011. In addition, the GW 1 adds a corresponding QoS requirement field to the semantic field set by using any method in the present invention, and then performs forwarding. The packet passes through a forwarding device 5 (the forwarding device may be a customer edge device node, and then reaches a forwarding device 6 (the forwarding device may be a provider edge router).

After receiving the packet, the forwarding device 6 needs to add new source routing information to the packet. In addition to the existing container C1, the forwarding device 6 adds a new container C2, and sets a flag bit of the new container C2, the first bit starting from left, to 1, to indicate that there is also an inner-layer container. In addition, a forwarding indication in the container 2 is 100, and a forwarding manner is source routing forwarding. Then, the forwarding device 6 encapsulates a corresponding element in the source routing list into the semantic field set by using the method in the embodiments. The forwarding device 6 may alternatively place the new source routing information in the C1 container, change the forwarding indication in the C1 container to 111, and encapsulate the corresponding element in the source routing list into the semantic field set of the C1 container by using the method in the embodiments.

After receiving the packet, nodes in a source routing domain (such as the forwarding device 6, a forwarding device 7, and a forwarding device 8 belong to the source routing domain) parse only the outermost container C2, parse the forwarding indication field according to the method in the embodiments, to learn of that the forwarding manner is the source routing forwarding, continue parsing out next-hop information in the "semantic field set" according to the method in the embodiments, and forward the packet to a next hop node.

Finally, the packet reaches an egress node in the source routing domain, namely, the forwarding device 8. The forwarding device 8 parses the outermost container C2, learns, based on the source routing information, of that the forwarding device 8 is the last hop in the source routing domain, and strips off the outermost C2 from the packet. Then, the forwarding device parses the container C1 in a same manner, to obtain destination address information. The forwarding device sets the indication information of C1 to 0, to indicate that the current container is the last container. The packet finally arrives at a destination node, namely, a host 6, through a forwarding device 9 and a gateway 2. After receiving the packet, the host 6 may perform parsing according to the method in the embodiments.

It can be understood that FIG. 13A and FIG. 13B are merely a possible example. For ease of understanding, only valid information, namely, a value of first packet header information, is provided in the figure, but type information and length information are not provided in the figure. However, in an actual encapsulation and parsing process, encapsulation and parsing still needs to be performed according to the method in the embodiments.

Figure 16:
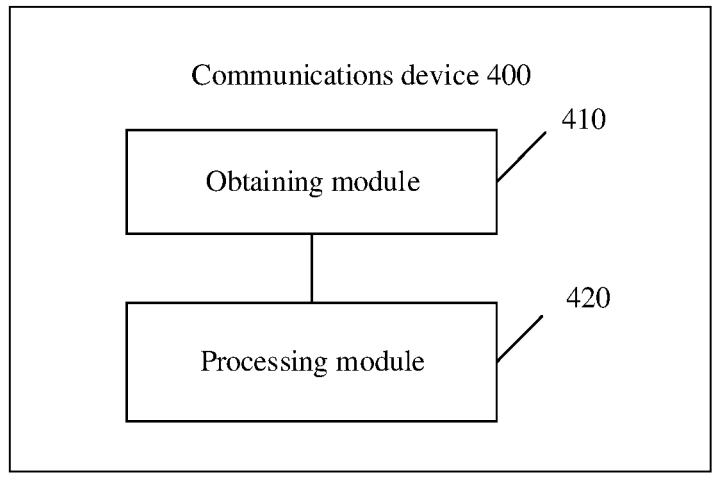
FIG. 16 is a schematic block diagram of a communications device according to an embodiment.

FIG. 16 is a schematic block diagram of a communications device 400 according to the embodiments. As shown in FIG. 16, the communications device 400 includes the following modules.

An obtaining module 410 is configured to obtain a data packet. The data packet includes a first packet header, the first packet header includes first indication information and a value of first packet header information, the first indication information is used to indicate a location of the value of the first packet header information, and the first packet header information is device identification information.

A processing module 420 is configured to process the data packet.

Optionally, the obtaining module 410 and the processing module 420 are configured to perform operations of the communication method 200 in the embodiments. For brevity, details are not described herein again.

The communications device completely corresponds to the first device in the method embodiments, and corresponding modules perform corresponding steps. For details, refer to the corresponding method embodiments.

Figure 17:
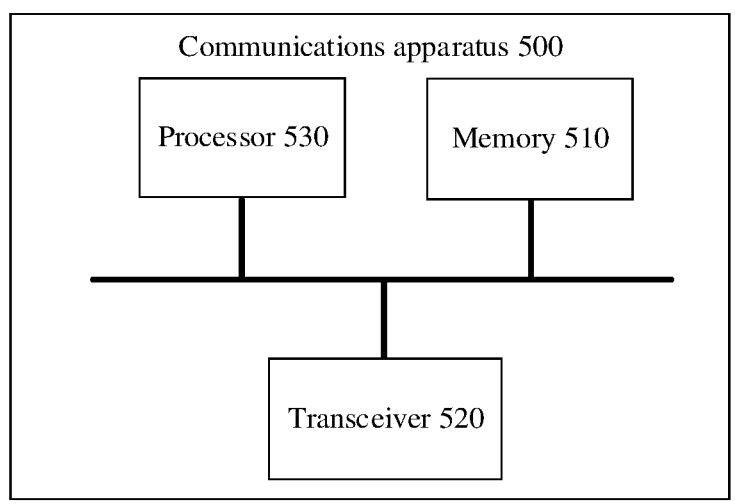
FIG. 17 is a schematic block diagram of a communications apparatus according to an embodiment.

FIG. 17 is a schematic block diagram of a communications apparatus 500 according to the embodiments. The communications apparatus 500 includes:

a memory 510, configured to store a program, where the program includes code;

a transceiver 520, configured to communicate with another device; and a processor 530, configured to execute the program code in the memory 510.

Optionally, when the code is executed, the processor 530 may implement operations of the method 200. For brevity, details are not described herein again. The transceiver 520 is configured to transmit and receive a signal while driven by the processor 530.

A person of ordinary skill in the art may be aware that units and algorithm steps in the examples described with reference to the embodiments can be implemented by electronic hardware or a combination of computer software and electronic hardware. Whether the functions are performed by hardware or software depends on particular applications and design constraints of the technical solutions. A person of ordinary skill in the art may use different methods to implement the described functions for each particular application, and such implementations should be considered as within the scope of the embodiments.

It may be clearly understood by a person of ordinary skill in the art that for the purpose of convenient and brief description, for a detailed working process of the described system, apparatus, and unit, refer to a corresponding process in the foregoing method embodiments. Details are not described herein gain.

In the several embodiments provided, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

It should be understood that the terms "and/or" and "at least one of A or B" in the embodiments describe only an association relationship for describing associated objects and represent that three relationships may exist. For example, A and/or B may represent the following three cases: only A exists, both A and B exist, and only B exists. In addition, the character "/" usually indicates an "or" relationship between the associated objects.

In addition, aspects or features of the embodiments may be implemented as a method, an apparatus, or an artifact that uses standard programming and/or engineering technologies. The term "product" used in the embodiments covers a computer program that can be accessed from any computer readable device, carrier, or medium. For example, a computer readable medium may include but is not limited to a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in the embodiments may represent one or more devices and/or other machine readable media that are configured to store information. The term "machine-readable media" may include, but is not limited to, various media that can store, contain, and/or carry instructions and/or data.

An embodiment further provides a computer-readable medium, configured to store a computer program. The computer program includes an instruction used to perform the communication method in the embodiment shown in FIG. 2. When the functions are implemented in a form of a software function unit and sold or used as an independent product, the functions may be stored in a computer readable storage medium. Based on such an understanding, the technical solutions of the embodiments essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by software, hardware, firmware, or any combination thereof. When being implemented by using the software, all or some of the embodiments may be implemented in a form of a computer program product. The computer program product includes one or more computer instructions. When the computer program instructions are loaded and executed on a computer, all or some of the procedures or functions according to the embodiments are generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, or a semi-conductor medium (for example, a solid-state drive (SSD)), or the like.

The foregoing are merely implementations of the embodiments, but are not intended to limit the protection scope. Any variation or replacement readily figured out by a person of ordinary skill in the art within the technical scope disclosed in the embodiments shall fall within the protection scope.

What is claimed is:

1. A communication method, comprising:
    obtaining, by a first device, a data packet, wherein the data packet comprises a first packet header, the first packet header comprises first indication information and a value of first packet header information, the first indication information is used to indicate a location of the value of the first packet header information, and the first packet header information is device identification information; and
    processing, by the first device, the data packet;
    wherein an $i^{th}$ basic unit in the first packet header comprises the value of the first packet header information which comprises $N_i$ consecutive first bits and $N_{i+1}$ consecutive second bits, wherein $i \geq 1$;
    the first indication information comprises third bits;
    the third bits are located before the $N_i$ consecutive first bits, and an $(i+1)^{th}$ basic unit comprises the $N_{i+1}$ consecutive second bits and the third bit before the $N_{i+1}$ consecutive second bits; and
    the third bit in the $i^{th}$ basic unit is used to indicate whether a next basic unit connected to the $i^{th}$ basic unit is the $(i+1)^{th}$ basic unit.

2. The method according to claim 1, wherein the value of the first packet header information comprises N consecutive bits, wherein $N \geq 1$; and
    the first indication information comprises a first value indicating the location of the value of the first packet header information, the first value is used to indicate a quantity N of the N consecutive bits or a quantity of basic units, and the basic unit is used to carry the N consecutive bits.

3. The method according to claim 2, wherein the first indication information comprises the first value indicating the location of the value of the first packet header information, and the first value comprises S consecutive bits; and
    the first packet header further comprises second indication information, the second indication information comprises a second value indicating a location of the first value, the second value is used to indicate a quantity of the S consecutive bits or a quantity of basic units, and the basic unit is used to carry the S consecutive bits.

4. The method according to claim 2, wherein the first value comprises $S_j$ consecutive fourth bits and $S_{j+1}$ consecutive fifth bits, wherein $j \geq 1$;
    second indication information comprises sixth bits, the first packet header further comprises the second indication information, and the second indication information comprises a location indicating the first indication information; and
    the sixth bits are located before the $S_j$ consecutive fourth bits, between the $S_j$ consecutive fourth bits and the $S_{j+1}$ consecutive fifth bits, and/or after the $S_{j+1}$ consecutive fifth bits.

5. The method according to claim 4, wherein a $j^{th}$ basic unit comprises the $S_j$ consecutive fourth bits and a sixth bit before the $S_j$ consecutive fourth bits, and a $(j+1)^{th}$ basic unit comprises the $S_{j+1}$ consecutive fifth bits and the sixth bit before the $S_{j+1}$ consecutive fifth bits; and
    the sixth bit in the $j^{th}$ basic unit is used to indicate whether a next basic unit connected to the $j^{th}$ basic unit is the $(j+1)^{th}$ basic unit.

6. The method according to claim 1, wherein the first packet header further comprises third indication information and a type of the first packet header information, and the third indication information is used to indicate a location of a type of the first packet header information.

7. The method according to claim 6, wherein the type of the first packet header information comprises Z consecutive bits, wherein $Z \geq 1$; and
    the third indication information comprises a third value indicating the location of the type of the first packet header information, the third value is used to indicate a quantity N of the Z consecutive bits or a quantity of basic units, and the basic unit is used to carry the Z consecutive bits.

8. The method according to claim 7, wherein the type of the first packet header information comprises $Z_k$ consecutive seventh bits and $Z_{k+1}$ consecutive eighth bits, wherein $k \geq 1$;
the third indication information comprises ninth bits; and
the ninth bits are located before the $Z_k$ consecutive seventh bits, between the $Z_k$ consecutive seventh bits and the $Z_{k+1}$ consecutive eighth bits, and/or after the $Z_{k+1}$ consecutive eighth bits.

9. The method according to claim 8, wherein a $k^{th}$ basic unit consists of the $Z_k$ consecutive seventh bits and a ninth bit before the $Z_k$ consecutive seventh bits, and a $(k+1)^{th}$ basic unit consists of the $Z_{k+1}$ consecutive eighth bits and the ninth bit before the $Z_{k+1}$ consecutive eighth bits; and
the ninth bit in the $k^{th}$ basic unit is used to indicate whether a next basic unit connected to the $k^{th}$ basic unit is the $(k+1)^{th}$ basic unit.

10. The method according to claim 1, wherein when a value of the first indication information is in a first interval, the first indication information is the value of the first packet header information; or
when a value of the first indication information is in a second interval, the first indication information is used to indicate the location of the value of the first packet header information.

11. The method according to claim 1, wherein the processing, by the first device, of the data packet comprises:
sending, by the first device, the data packet to an intermediate node; or
parsing, by the first device, the data packet, and determining whether to forward the data packet.

12. A communications device, wherein the communications device is a first device, comprising:
an obtaining module, the obtaining module configured to obtain a data packet, the data packet comprising a first packet header, the first packet header comprising first indication information and a value of first packet header information, the first indication information is used to indicate a location of the value of the first packet header information, and the first packet header information is device identification information; and
a processing module configured to process the data packet,
wherein an $i^{th}$ basic unit in the first packet header comprises the value of the first packet header information which comprises $N_i$ consecutive first bits and $N_{i+1}$ consecutive second bits, wherein $i \geq 1$;
the first indication information comprises third bits;
the third bits are located before the $N_i$ consecutive first bits, and an $(i+1)^{th}$ basic unit comprises the $N_{i+1}$ consecutive second bits and the third bit before the $N_{i+1}$ consecutive second bits; and
the third bit in the $i^{th}$ basic unit is used to indicate whether a next basic unit connected to the $i^{th}$ basic unit is the $(i+1)^{th}$ basic unit.

13. The communications device according to claim 12, wherein the value of the first packet header information comprises N consecutive bits, wherein $N \geq 1$; and
the first indication information comprises a first value indicating the location of the value of the first packet header information, the first value is used to indicate a quantity N of the N consecutive bits or a quantity of basic units, and the basic unit is used to carry the N consecutive bits.

14. The communications device according to claim 13, wherein the first indication information comprises the first value indicating the location of the value of the first packet header information, and the first value comprises S consecutive bits; and
the first packet header further comprises second indication information, the second indication information comprises a second value indicating a location of the first value, the second value is used to indicate a quantity of the S consecutive bits or a quantity of basic units, and the basic unit is used to carry the S consecutive bits.

15. The communications device according to claim 5, wherein the first value comprises $S_j$ consecutive fourth bits and $S_{j+1}$ consecutive fifth bits, wherein $j \geq 1$;
second indication information comprises sixth bits, the first packet header further comprises the second indication information, and the second indication information comprises a location indicating the first indication information; and
the sixth bits are located before the $S_j$ consecutive fourth bits, between the $S_j$ consecutive fourth bits and the $S_{j+1}$ consecutive fifth bits, and/or after the $S_{j+1}$ consecutive fifth bits.

16. The communications device according to claim 15, wherein a $j^{th}$ basic unit comprises the $S_j$ consecutive fourth bits and a sixth bit before the $S_j$ consecutive fourth bits, and a $(j+1)^{th}$ basic unit consists of the $S_{j+1}$ consecutive fifth bits and the sixth bit before the $S_{j+1}$ consecutive fifth bits; and
the sixth bit in the $j^{th}$ basic unit is used to indicate whether a next basic unit connected to the $j^{th}$ basic unit is the $(j+1)^{th}$ basic unit.

* * * * *